United States Patent
Yun et al.

(10) Patent No.: US 11,006,486 B2
(45) Date of Patent: May 11, 2021

(54) COOKING APPARATUS AND METHOD FOR CONTROLLING THE SAME

(71) Applicant: SAMSUNG ELECTRONICS CO., LTD., Suwon-si (KR)

(72) Inventors: Chang Sun Yun, Suwon-si (KR); Dong Oh Kang, Seoul (KR); Hong-Joo Kang, Suwon-si (KR); Ji Woong Choi, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 278 days.

(21) Appl. No.: 16/124,949

(22) Filed: Sep. 7, 2018

(65) Prior Publication Data

US 2019/0021141 A1     Jan. 17, 2019

Related U.S. Application Data

(62) Division of application No. 14/932,217, filed on Nov. 4, 2015, now Pat. No. 10,455,647.

(30) Foreign Application Priority Data

Nov. 26, 2014  (KR) ..................... 10-2014-0166184
Aug. 28, 2015  (KR) ..................... 10-2015-0121387

(51) Int. Cl.
*H05B 6/06*     (2006.01)
*H05B 6/12*     (2006.01)

(52) U.S. Cl.
CPC .......... *H05B 6/065* (2013.01); *H05B 6/1272* (2013.01); *H05B 2206/022* (2013.01); *Y02B 40/00* (2013.01)

(58) Field of Classification Search
CPC .............. H05B 6/1272; H05B 6/065; H05B 2206/022; Y02B 40/126
(Continued)

(56) References Cited

U.S. PATENT DOCUMENTS

| | | |
|---|---|---|
| 5,808,280 A | 9/1998 | Gaspard |
| 2009/0139980 A1 | 6/2009 | Acero Acero et al. |

(Continued)

FOREIGN PATENT DOCUMENTS

| | | |
|---|---|---|
| DE | 101 63 839 A1 | 7/2003 |
| DE | 10 2012 220 324 A1 | 6/2013 |

(Continued)

OTHER PUBLICATIONS

U.S. Office Action dated Mar. 15, 2019 from U.S. Appl. No. 14/932,217.

(Continued)

*Primary Examiner* — Quang T Van
(74) *Attorney, Agent, or Firm* — Staas & Halsey LLP

(57) ABSTRACT

A cooking apparatus and a method for controlling the cooking apparatus are provided. The cooking apparatus includes induction heating coils that include a high power burner in which a first heating coil and a second heating coil are concentric. The cooking apparatus includes a low power burner that includes a third heating coil and a fourth heating coil, a power supply unit that includes a first AC power supply unit and a second AC power supply unit which have a different phase from each other, and a coil driving unit that provides power supplied by the first AC power supply unit to the first heating coil, and provides power supplied by the second AC power supply unit to at least one of the second heating coil, the third heating coil, and the fourth heating coil.

11 Claims, 35 Drawing Sheets

(58) Field of Classification Search
USPC .............. 219/624–628, 660, 662, 663, 656, 219/665–669, 622, 443.1, 448.11, 489; 126/1 R
See application file for complete search history.

(56) References Cited

U.S. PATENT DOCUMENTS

| | | | |
|---|---|---|---|
| 2011/0011851 A1* | 1/2011 | Kataoka | H05B 6/1272 219/622 |
| 2011/0253706 A1 | 10/2011 | Wang et al. | |
| 2012/0043312 A1 | 2/2012 | Lee et al. | |
| 2015/0054348 A1* | 2/2015 | Akiya | H02J 50/10 307/104 |
| 2016/0029439 A1 | 1/2016 | Kurose et al. | |

FOREIGN PATENT DOCUMENTS

| | | | |
|---|---|---|---|
| EP | 2 670 213 A2 | 5/2013 | |
| WO | WO 2007/048700 A1 | 5/2007 | |
| WO | WO 2014/033580 A1 | 3/2014 | |

OTHER PUBLICATIONS

Extended European Search Report dated Apr. 25, 2016 in European Patent Application No. 15193676.2.
U.S. Office Action dated Jul. 27, 2018 from U.S. Appl. No. 14/932,217.
U.S. Appl. No. 14/932,217, filed Nov. 4, 2015, Chang Sun Yun, Samsung Electronics Co., Ltd.
Translation of DE 102012220324A1, Induction heater, European Patent Office, http://worldwide.espacenet.com/publicationDetails (Year:2013).
U.S. Office Action dated Oct. 23, 2018 from U.S. Appl. No. 14/932,217.
European Office Action dated Jul. 23, 2019 from European Patent Application No. 15193676.2, 5 pages.
U.S. Notice of Allowance dated Jun. 5, 2019 from U.S. Appl. No. 14/932,217.

* cited by examiner

COOKING APPARATUS AND METHOD FOR CONTROLLING THE SAME

CROSS-REFERENCE TO RELATED APPLICATIONS

This application is a divisional of U.S. patent application Ser. No. 14/932,217, filed on Nov. 4, 2015, which is currently pending, and is related to, and claims the priority benefit of Korean Patent Application No. 10-2014-0166184 filed on Nov. 26, 2014 in the Korean Intellectual Property Office and of Korean Patent Application No. 10-2015-0121387 filed on Aug. 28, 2015, in the Korean Intellectual Property Office, the disclosures of which are incorporated herein by reference.

BACKGROUND

1. Field

Embodiments of the at least one exemplary embodiment relate to a cooking apparatus and a method for controlling the same.

2. Description of the Related Art

A cooking apparatus is a device for heating and cooking an object to be cooked such as food, and for example, refers to an oven, a microwave heating apparatus (electronic range or microwave), a gas range, or an electric range.

An induction heating cooking apparatus is a device for heating and cooking the food using the principle of induction heating to convert electrical energy into thermal energy by electromagnetic induction. The induction heating cooking apparatus includes a cooking plate on which a cooking vessel is placed and induction coils that generate a magnetic field when a current is applied to the induction coils.

When the current is applied to the induction coils to generate the magnetic field, a secondary current is induced in the cooking vessel, and the Joule heat is generated by the resistive component of the cooking vessel itself. Thus, the cooking vessel is heated and food contained in the cooking vessel is cooked.

SUMMARY

Therefore, it is an aspect of the at least one exemplary embodiment to provide a cooking apparatus that provides power of different power supply units to heating coils in a high power burner including a plurality of heating coils, and a method for controlling the same.

Additional aspects of the invention will be set forth in part in the description which follows and, in part, will be obvious from the description, or may be learned by practice of the invention.

In accordance with one aspect of the at least one exemplary embodiment, a cooking apparatus includes a plurality of induction heating coils, at least one of the plurality of induction heating coils including a high power burner that includes a first heating coil and a second heating coil that are concentric, and at least another of the plurality of induction heating coils including a low power burner that includes at least one of a third heating coil and a fourth heating coil, a power supply unit that includes a first alternating current (AC) power supply unit and a second AC power supply unit which have a different phase from each other, and a coil driving unit that provides power at least one of power supplied by the first AC power supply unit to the first heating coil, and power supplied by the second AC power supply unit to the at least one of the second heating coil, the third heating coil, and the fourth heating coil.

The power supply unit may include a rectifying unit including at least one of a first rectifying unit that rectifies a power supplied by the first AC power supply unit and a second rectifying unit that rectifies a power supplied by the second AC power supply unit.

The rectifying unit may include a third rectifying unit and a fourth rectifying unit that rectify the power supplied by the second AC power supply unit.

The cooking apparatus may include a control unit that controls the coil driving unit to distribute the power supplied by the second AC power supply unit and provide the distributed power to the second heating coil to the fourth heating coil, and controls the coil driving unit to distribute the power supplied by the second AC power supply unit to one heating coil having a priority among the second heating coil to the fourth heating coil.

The control unit may distribute the power of the second AC power supply unit so that power obtained by subtracting the power provided to the second heating coil from maximum power of the second AC power supply unit is provided to the third heating coil and the fourth heating coil.

The control unit may distribute the power of the second AC power supply unit so that power obtained by subtracting the power provided to the third heating coil from maximum power of the second AC power supply unit is provided to the second heating coil and the fourth heating coil.

The control unit may distribute the power of the second AC power supply unit so that power obtained by subtracting the power provided to the fourth heating coil from maximum power of the second AC power supply unit is provided to the second heating coil and the third heating coil.

The cooking apparatus may further include a current detection unit that detects power provided to the first heating coil to the fourth heating coil by detecting a current introduced into the induction heating coils.

The cooking apparatus may further include a current detection unit that detects power to be consumed by the power supply unit by detecting a current flowing out from the first AC power supply unit and the second AC power supply unit.

The cooking apparatus may further include a user interface that receives an output level of the induction heating coils from a user.

The cooking apparatus may include a switching unit that switches outputs of the first AC power supply unit and the second AC power supply unit, and a control unit that controls the switching unit so that the power of the first AC power supply unit is provided to the second heating coil to the fourth heating coil when an operation according to the received output level exceeds maximum power of the second AC power supply unit.

The cooking apparatus may include a control unit that controls the coil driving unit so that the power supplied by the first AC power supply unit is provided to at least one of the second heating coil, the third heating coil, and the fourth heating coil when an operation according to the received output level exceeds maximum power of the second AC power supply unit.

An output terminal of the power supply unit may be connected to share a power supply by the first AC power supply unit and a power supply by the second AC power supply unit.

In accordance with at least one exemplary embodiment, a cooking apparatus includes a plurality of induction heating coils, at least one of the plurality of induction heating coils including a high power burner that includes in a first heating coil and a second heating coil that are concentric, and at least another of the plurality of inducting heating coils including a low power burner that includes a third heating coil and a fourth heating coil, a power supply unit that includes a first power supply unit and a second power supply unit which have a different phase from each other, and a switching unit that performs a switching so that at least one of power supplied by the first power supply unit and power supplied by the second power supply unit is provided to the first heating coil and the other one is provided to at least one of the second heating coil, the third heating coil, and the fourth heating coil.

The switching unit may distribute power to the heating coil to which power of the same power supply unit is provided, at a preset ratio.

The at least one of power supplied from the first power supply unit and power supplied from the second power supply unit may be AC power.

The cooking apparatus may include a rectifying unit that rectifies the AC power supplied from the first power supply unit and the AC power supplied from the second power supply unit.

In accordance with an aspect of at least one exemplary embodiment, a method for controlling a cooking apparatus includes supplying power of a first AC power supply unit to a first heating coil included in a high power burner, supplying power of a second AC power supply unit to a second heating coil included in the high power burner and a third heating coil and a fourth heating coil each included in a low power burner; and distributing the supplied power of the second AC power supply unit to at least one heating coil having a higher priority among the second heating coil, the third heating coil, and the fourth heating coil.

The distributing of the power of the second AC power supply unit may include distributing the power supplied by the second AC power supply unit so that power obtained by subtracting power provided to the third heating coil from maximum power of the second AC power supply unit is provided to the second heating coil and the fourth heating coil.

The distributing of the power of the second AC power supply unit may include distributing the power of the second AC power supply unit so that power obtained by subtracting power provided to the second heating coil from maximum power of the second AC power supply unit is provided to the third heating coil and the fourth heating coil.

The distributing of the power of the second AC power supply unit may include distributing the power of the second AC power supply unit so that power obtained by subtracting power provided to the fourth heating coil from maximum power of the second AC power supply unit is provided to the second heating coil and the third heating coil.

The method for controlling the cooking apparatus may further include detecting power provided to the first heating coil to the fourth heating coil by detecting a current introduced into the first heating coil to the fourth heating coil.

The method for controlling the cooking apparatus may include detecting power to be consumed by the power supply unit by detecting a current flowing out from the first AC power supply unit and the second AC power supply unit.

The method for controlling the cooking apparatus may include receiving an output level of induction heating coils from a user.

The method for controlling the cooking apparatus may include switching a switching unit so that the power supplied by the first AC power supply unit is provided to at least one of the second heating coil, the third heating coil, and o the fourth heating coil when an operation according to the received output level exceeds maximum power of the second AC power supply unit.

The method for controlling the cooking apparatus may include adjusting a coil driving unit so that the power of the first AC power supply unit is provided to the second heating coil to the fourth heating coil when an operation according to the received output level exceeds maximum power of the second AC power supply unit.

In accordance with at least one exemplary embodiment, a cooking apparatus includes a plurality of induction heating coils, at least one of the plurality of induction heating coils including a high power burner that includes a first heating coil and a second heating coil that are concentric, and at least one of the plurality of induction heating coils including a low power burner that includes a third heating coil and a fourth heating coil, a first substrate including a first AC power supply unit to supply a first AC power, a second substrate including a second AC power supply unit to supply a second AC power having a different phase from that of the first supplied AC power, and a switching unit that includes a substrate being physically separable from the first substrate and the second substrate, that switches at least one of the supplied first AC power and the supplied second AC power each transmitted from at least one of the first substrate and the second substrate, and that transmits the switched supplied AC power to at least one of the first heating coil to the fourth heating coil.

A first coil driving circuit to supply a driving power supply to the first heating coil and a second coil driving circuit to supply a driving power supply to the second heating coil may be installed in the first substrate, a third coil driving circuit to supply a driving power supply to the third heating coil and a fourth coil driving circuit to supply a driving power supply to the fourth heating coil may be provided in the second substrate, and the switching unit may switch at least one of the first AC power supply and the second AC power supply and transmit the switched AC power supply to at least one of the first coil driving circuit to the fourth coil driving circuit.

In accordance with at least one exemplary embodiment, a cooking apparatus includes a plurality of induction heating coils, at least one of the plurality of induction heating coils including a high power burner that includes a first heating coil and a second heating coil that are concentric and at least another of the plurality of induction heating coils includes a low power burner that includes a third heating coil and a fourth heating coil, a first AC power supply unit to output a first AC, a second AC power supply unit that to output a second AC of a different phase from that of the first AC, and a switching unit that selectively transmits at least one of the outputted first AC and the outputted second AC to at least one of the first heating coil and the second heating coil while transmitting the outputted first AC to the first heating coil and distributing and transmitting the outputted second AC to the third heating coil and the fourth heating coil.

BRIEF DESCRIPTION OF THE DRAWINGS

These and/or other aspects of the invention will become apparent and more readily appreciated from the following description of the embodiments, taken in conjunction with the accompanying drawings.

FIG. 100 is a circuit diagram illustrating a coil driving circuit in accordance with at least one exemplary embodiment.

DETAILED DESCRIPTION

Figure 1:
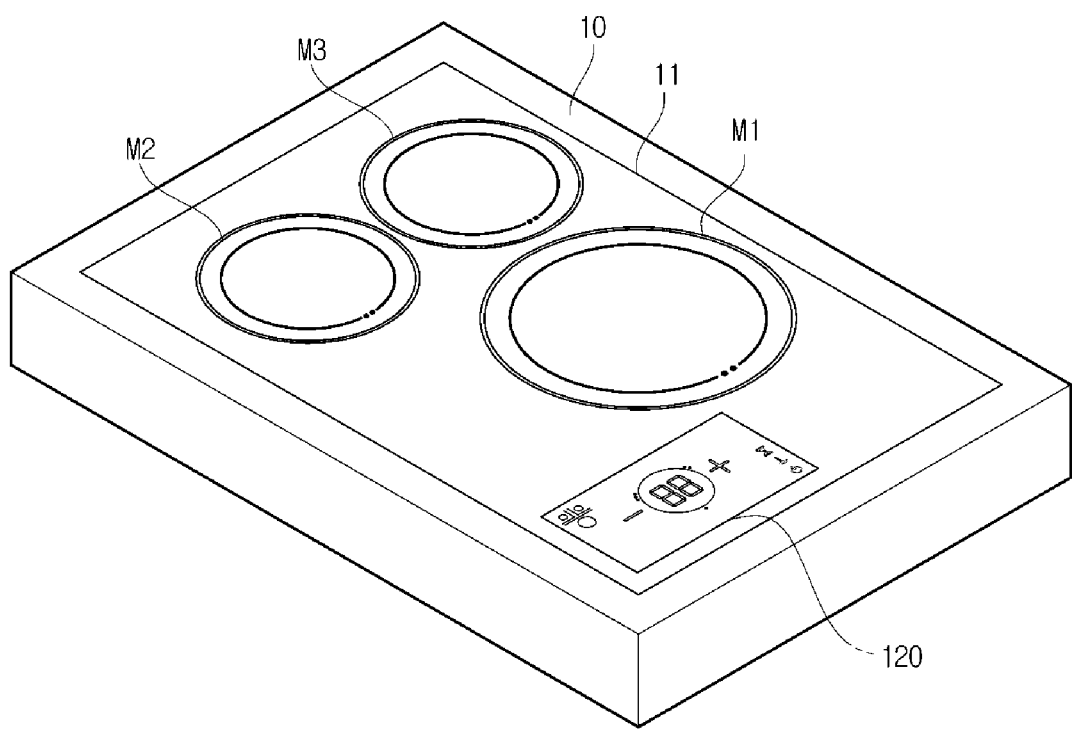
FIG. 1 is a perspective view illustrating a cooking apparatus in accordance with at least one exemplary embodiment.

Reference will now be made in detail to the embodiments, examples of which are illustrated in the accompanying drawings, wherein like reference numerals refer to the like elements throughout. The embodiments are described below to explain the at least one exemplary embodiment by referring to the figures.

A cooking apparatus according to the at least one exemplary embodiment will be described by examples with reference to the accompanying drawings as described in detail to enable those skilled in the art to easily understand and reproduce.

The terms used herein are consistent with definitions in the art. A In addition, certain terms may be defined herein.

In addition, illustrated exemplary embodiments may be variously combined and/or separated.

A cooking apparatus and a method for controlling the cooking apparatus in accordance with at least one exemplary embodiment will be described with reference to the accompanying drawings.

A configuration of a cooking apparatus in accordance with at least one exemplary embodiment will be described with reference to FIGS. 1 to 5.

Figure 2:
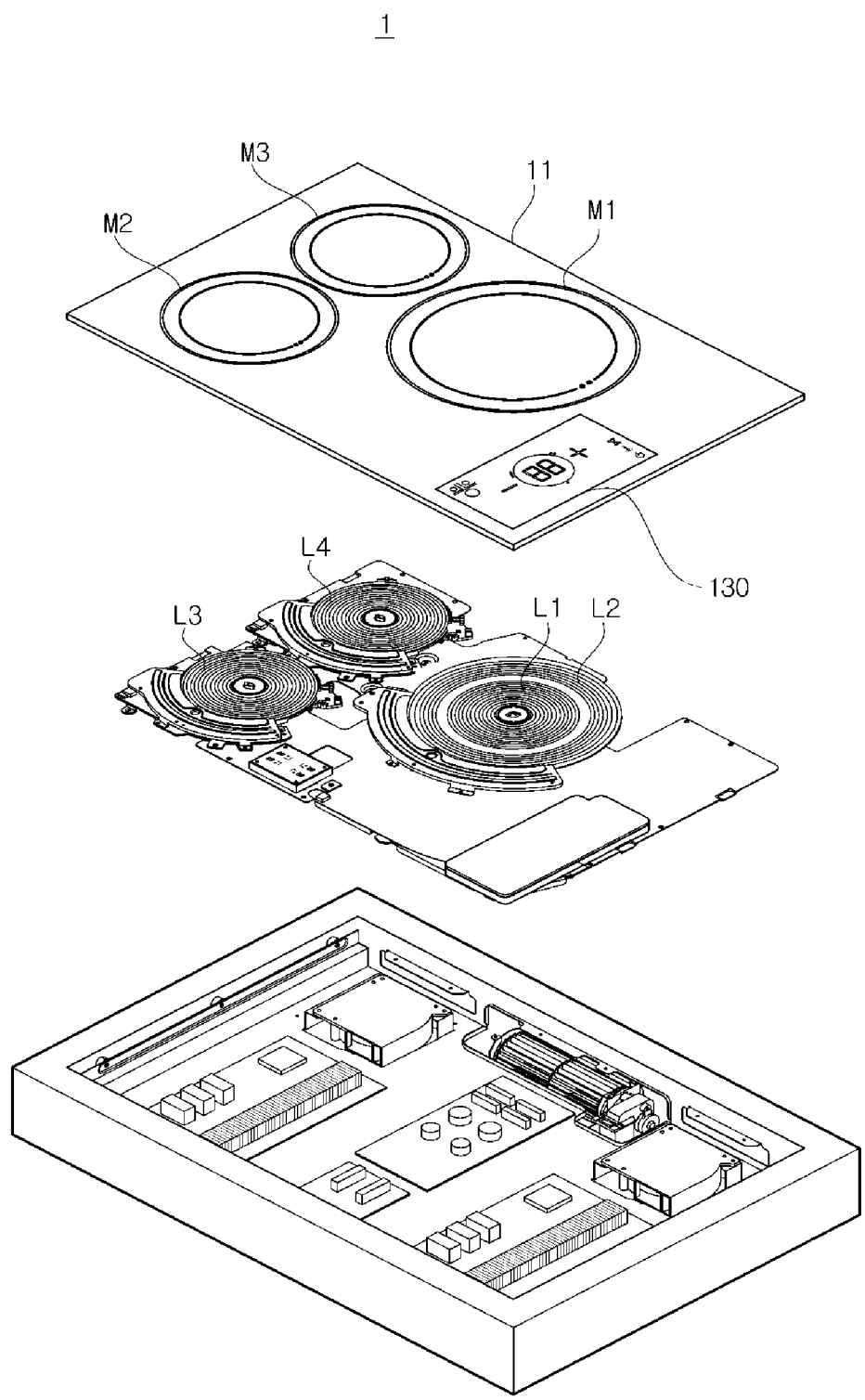
FIG. 2 is an exploded view illustrating a cooking apparatus in accordance with at least one exemplary embodiment.
Figure 3:
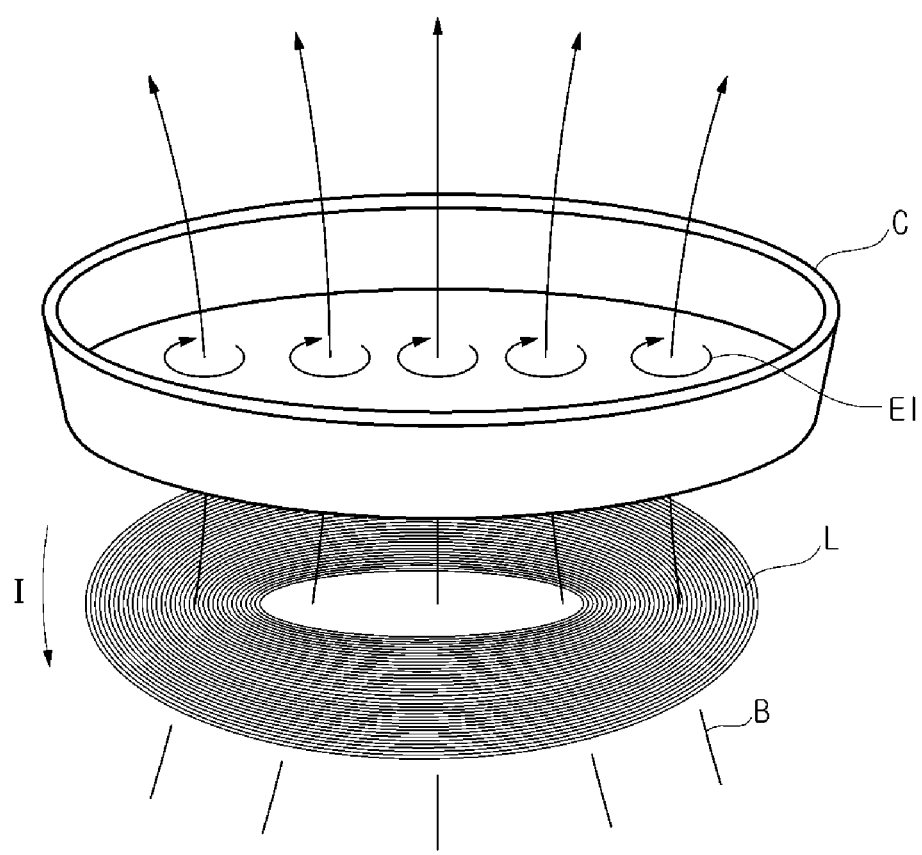
FIG. 3 is a view illustrating a cooking apparatus in accordance with at least one exemplary embodiment that heats a cooking vessel.
Figure 4:
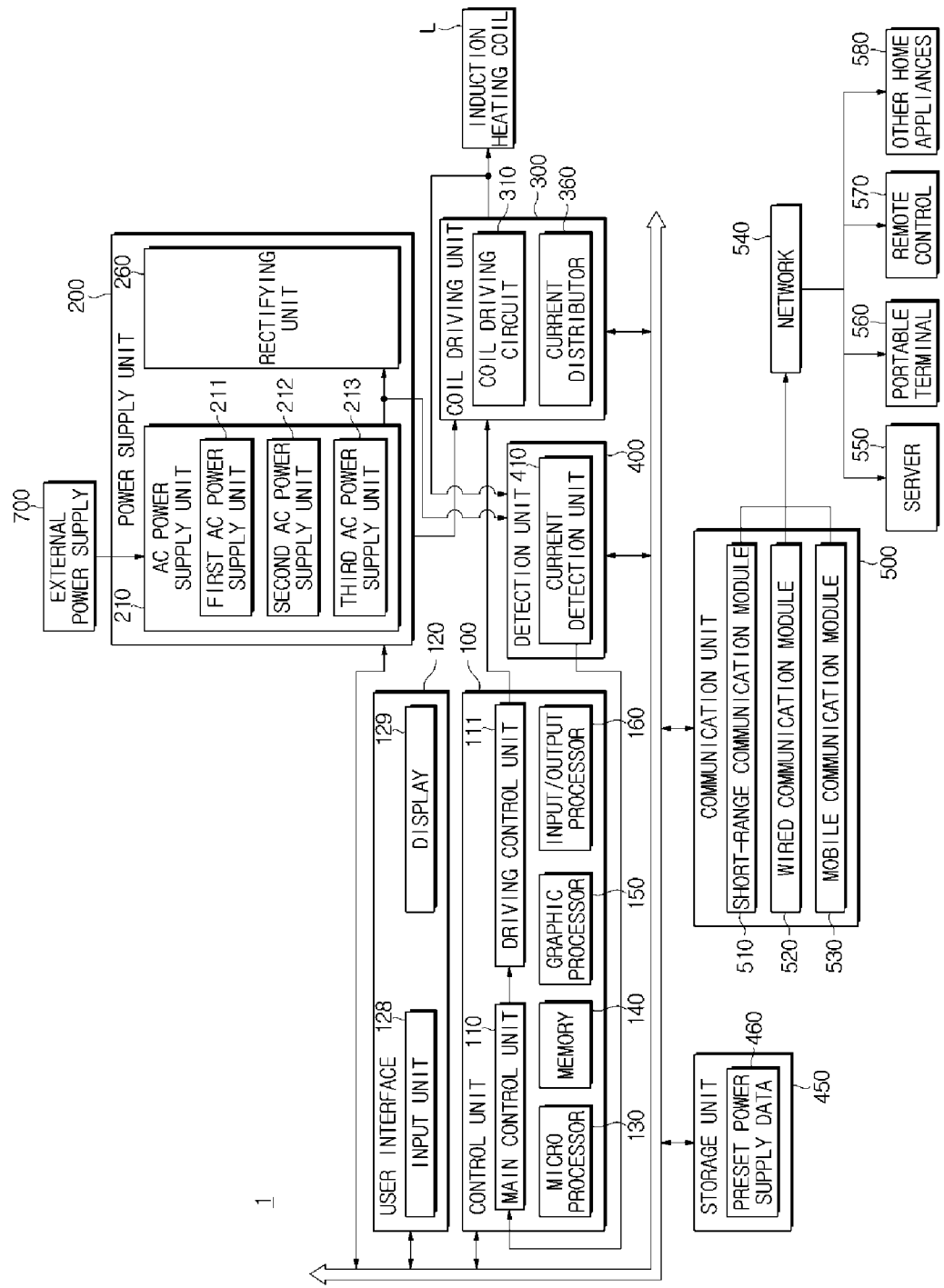
FIG. 4 is a block diagram illustrating a cooking apparatus in accordance with at least one exemplary embodiment.
Figure 5:
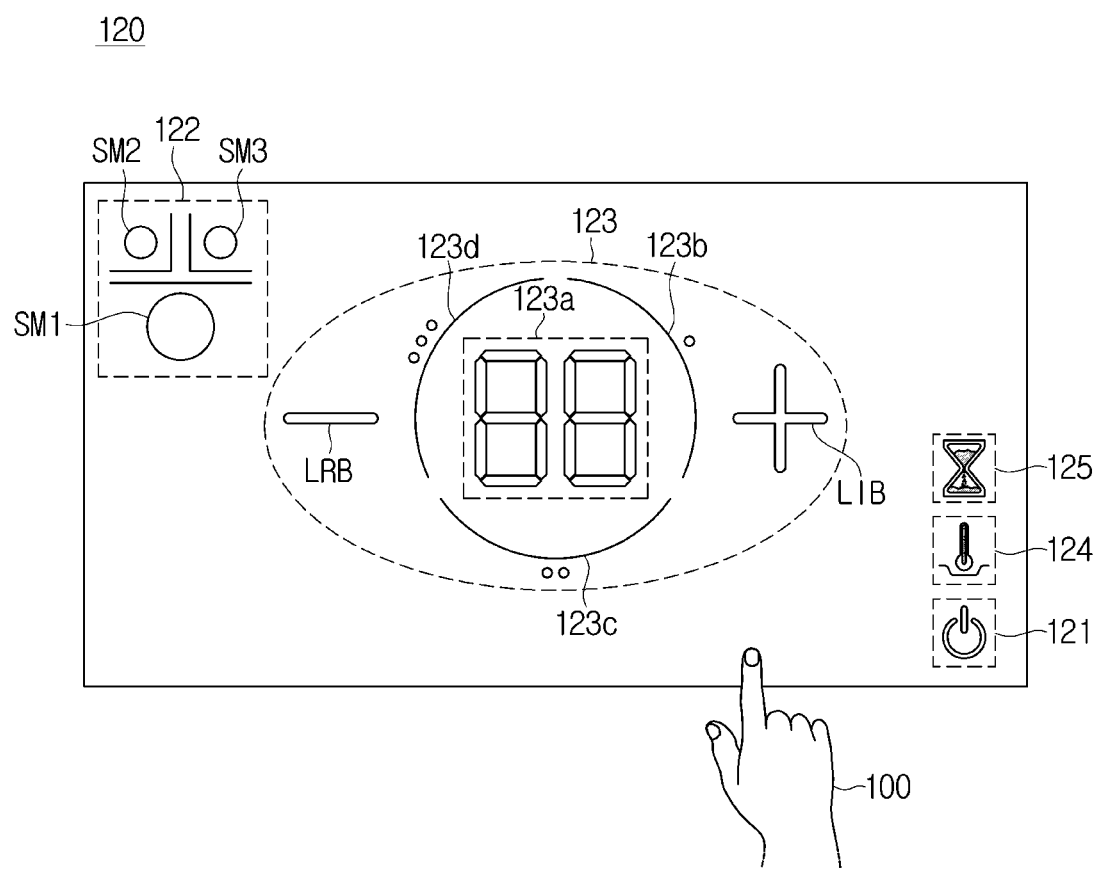
FIG. 5 is a view illustrating a user interface included in a cooking apparatus in accordance with at least one exemplary embodiment.

FIG. 1 illustrates a cooking apparatus, FIG. 2 illustrates an internal configuration of a cooking apparatus, FIG. 3 is a view illustrating a principle of a cooking apparatus heating a cooking vessel, FIG. 4 is a block diagram illustrating a configuration of a cooking apparatus, and FIG. 5 illustrates a user interface included in a cooking apparatus.

Referring to FIGS. 1 to 5, a cooking apparatus 1 includes a main body 10 formed therein, which forms the appearance of the cooking apparatus 1 and accommodates various components of the cooking apparatus 1.

A cooking plate 11 on which a cooking vessel C may be positioned may be provided on an upper surface of the main body 10.

The cooking plate 11 may be made of tempered glass such as ceramic glass for example, so that it cannot be easily broken. Indicator marks M1, M2, and M3 may be formed on the cooking plate 11 as illustrated in FIG. 1, so that a user may guide the position of the cooking vessel C.

Below the cooking plate 11, a plurality of heating coils L1, L2, L3, and L4 that generate a magnetic field may be provided. The plurality of heating coils L1, L2, L3, and L4 may be provided in positions corresponding to the indicator marks M1, M2, and M3, respectively.

The plurality of heating coils L1, L2, L3, and L4 may include a first heating coil L1, a second heating coil L2, a third heating coil L3, and a fourth heating coil L4, as illustrated in FIG. 2. The first heating coil L1 and the second heating coil L2 may be concentric, for example, so that a high power burner HB may be installed.

The cooking apparatus 1 in accordance with at least one exemplary embodiment may include four induction heating coils L1, L2, L3, and L4, but the number of induction heating coils of the cooking apparatus is not limited thereto. According to at least one exemplary embodiment, the cooking apparatus 1 may include three induction heating coils or less or five induction heating coils or more.

As illustrated in FIG. 3, when a current is supplied to the induction heating coils L, a magnetic field B passing through the inside of the induction heating coils L may be induced. When a current which is changed over time, that is, an alternating current (AC) is supplied to the induction heating coil L, the magnetic field B which is changed over time may be induced inside the induction heating coils L. The magnetic field B generated by the induction heating coils L in this manner may pass through a bottom surface of the cooking vessel C. When the magnetic field B that changed over time passes through a conductor, a current that rotates about the magnetic field B may be generated in the conductor. Thus, a current may be induced by the magnetic field B changed over time and referred to as an electromagnetic induction phenomenon, and the rotating current referred to as an eddy current. In a cooking apparatus 1 using induction heating, the electromagnetic induction phenomenon and the eddy current may be generated at the bottom surface of the cooking vessel C. When the magnetic field B generated by the induction heating coils L passes through the bottom surface of the cooking vessel C, an eddy current EI which rotates about the magnetic field B is generated inside the bottom surface of the cooking vessel C. The cooking vessel C may be heated by the eddy current EI. When the eddy current EI flows in the cooking vessel C having electrical resistance, nucleuses of the cooking vessel C and electrons caused by the eddy current EI collide with each other. By such collision between the nucleuses and the electrons, heat may be generated.

Through this process, the cooking apparatus 1 may supply a current to the induction heating coils L, and heat the cooking vessel C using the magnetic field B which is generated by the induction heating coils L.

As illustrated in FIG. 4, the cooking apparatus 1 may include induction heating coils L, a power supply unit 200, a coil driving unit 300, a detection unit 400, a control unit 100, a storage unit 450, a communication unit 500, and a user interface 120.

The induction heating coils L may generate a magnetic field so that an eddy current flows in the cooking vessel C. The induction heating coils L may be identical to or different from the induction heating coils L of FIGS. 1 to 3.

The power supply unit 200 receives external power supply and converts the received external power supply into direct current (DC) power supply.

The power supply unit 200 may receive a single-phase power supply or three-phase power supplies from an external single-phase alternating current (AC) power supply 700, and rectify each of the three phase AC power supplies and convert the rectified power supplies into three DC power supplies, when the three-phase power supplies are supplied. The power supply unit 200 may include an AC power supply unit 210 and a rectifying unit 260.

The AC power supply unit 210 may receive the external AC power supply 700 and convert the received AC power supply 700 into the three-phase AC power supplies. The AC power supply unit 210 may include a first AC power supply unit 211 that generates a U-shaped AC power supply, a second AC power supply unit 212 that generates a V-shaped AC power supply, and a third AC power supply unit 213 that generates a W-shaped AC power supply. The first AC power supply unit 211 to the third AC power supply unit 213 cannot use power equal to or larger than specific power. For example a current of maximum 16 A and a power of maximum 3.6 kW in the single-phase may be generated. Thus, the cooking apparatus 1 may generate a power supply with a total power of 10.8 kW.

The rectifying unit 260 may generate a DC power supply by rectifying the three-phase AC power supplies generated by the AC power supply unit 210. The rectifying unit 260 may uniformly maintain the generated DC power supply by reducing a change in the DC power supply. That is, the rectifying unit 260 may include a rectifying circuit RC that converts an AC power supply into a DC power supply and a smoothing circuit SC for maintaining uniformly the converted DC power supply. For example, the rectifying circuit RC may be provided in the form in which full bridge type-four diodes are arranged, and the smoothing circuit SC may be provided as a capacitor connected in parallel to two terminals.

The coil driving unit 300 may convert the introduced DC power supply into a high frequency power supply and supply the high frequency power supply to the induction heating coils L, and distribute a current to flow in the plurality of heating coils and adjust power to be consumed by the heating coils. The coil driving unit 300 may include a coil driving circuit 310 and a current distributor 360.

The detection unit 400 detects an operation of the cooking apparatus 1 and transmits the detected operation to the control unit 100. The detection unit 400 may include a current detection unit 410 that detects an input current that is supplied from the AC power supply unit 210 to the rectifying unit 260 and a driving current that is supplied from the coil driving unit 300 to the induction heating coils L.

The control unit 100 may control the overall operations of the cooking apparatus 1.

The control unit 100 may include a main control unit 110 that controls the operation of the cooking apparatus 1 based on power of each of the heating coils detected by the detection unit 400, user commands of the user interface 120, preset power supply data of the storage unit 450, and the like, and a driving control unit 111 that controls the coil driving unit 300 and a switching unit 800 in response to a control command of the main control unit 110.

The control unit 100 may transmit a control signal to a component to perform each operation so as to perform the operation of the cooking apparatus 1 according to an input command of a user. The control unit 100 controls an overall operation and signal flows between internal components of the cooking apparatus 1 and processes data. The control unit 100 controls the power supplied by the power supply unit 200 to be transmitted to the internal components of the cooking apparatus 1. The control unit 100 may determine priorities of the plurality of heating coils based on a plurality of driving currents detected by the current detection unit 410, and distribute the current to distribute the power supplied to the heating coils.

The control unit 100 may transmit the control signal corresponding to an output level input to the user interface 120 to the coil driving unit 300 to adjust the size and frequency of the high frequency power supply generated by the coil driving circuit of the coil driving unit 300. In addition, when the power consumed by the heating coil connected to the second AC power supply unit 212 is larger than a maximum power of the second AC power supply unit 212, the control unit 100 may determine priorities of the plurality of heating coils, and divide the power provided to the plurality of heating coils. By selectively cutting off the supply of a driving power supply supplied to the heating coils by the coil driving circuit, the control unit 100 may supply the driving power supply to the heating coils included in a burner requiring an operation, and cut off the supply of the driving power supply to the heating coils included in a burner not requiring an operation. The control unit 100 may compare power consumed by each of the heating coils detected by the detection unit 400, and determine the load of the first AC power supply unit 211 and the second AC power supply unit 212. The control unit 100 may supply power to the burner requiring the operation by adjusting the switching unit 800 or the coil driving circuit based on the determined load of the AC power supply unit 210.

The control unit 100 may be implemented as a central processing unit (CPU), and implemented as, for example, as a microprocessor 130. The microprocessor 130 may be a processing device in which an arithmetic logic calculator, a register, a program counter, an instruction decoder, a control circuit, and the like are provided in one or more silicon chips. The microprocessor 130 may be implemented in the form of system on chip (SoC) including a core and a GPU. The microprocessor 130 may include a single-core, a dual-core, a triple-core, a quad-core, and a core of a multiple thereof.

The control unit 100 may include a graphic processing unit (GPU) 150 for graphic processing of images or videos.

The control unit 100 may include an input/output processor 160 that mediates data access between various components included in the cooking apparatus 1 and the control unit 100, and a memory 140 that temporarily or non-temporarily stores programs and data. The memory 140 may be implemented using RAM or ROM.

The storage unit 450 may store data and programs required for the control of the cooking apparatus 1. For example, the storage unit 450 may store preset power supply data 460 for adjusting a driving power supply supplied to the heating coils. The preset power supply data 460 is data that determines a driving current to be distributed in each of the heating coils based on the driving current supplied to each of the heating coils detected by the current detection unit 410, and determines a switching operation for receiving power of a different phase when an output level input according to a user command exceeds a maximum power according to a user's command input to the user interface 120.

The storage unit 450 may include non-volatile memories such as a ROM, a high-speed random access memory (RAM), a magnetic disk storage device, a flash memory device, and the like, or other non-volatile semiconductor memory devices.

For example, as the storage unit 450 which is a semiconductor memory device, an secure digital (SD) memory card, an secure digital high capacity (SDHC) memory card, a mini SD memory card, a mini SDHC memory card, a trans flash (TF) memory card, a micro SD memory card, a micro SDHC memory card, a memory stick, a compact flash (CF), a multimedia card (MMC), an MMC micro, an extreme digital (XD) card, and the like may be used.

The storage unit 450 may include a network attached storage device that is accessible through a network.

The communication unit 500 may be connected to a network 540 in a wired/wireless manner, and thereby communicate with external other home appliances 580 and/or a server 550. The communication unit 500 may transmit and receive data to and from the server 550 connected through a home server 550 or to and from the other home appliances 580 in the house. The communication unit 500 may perform data communication according to the standard of the home server.

The communication unit 500 may transmit and receive data related to remote control through the network 540, and transmit and receive information related to the operations of the other home appliances 580. Further, the communication unit 500 may receive information about a user's life pattern from the server 550, and utilize the received information in the operation of the cooking apparatus 1. The communication unit 500 may perform data communication with a portable terminal 560 of a user as well as the server 550 in the house or a remote control 570.

The communication unit 500 may be connected to the network 540 in a wired/wireless manner, and transmit and receive data to and/or from the server 550, the remote control 570, the portable terminal 560, or the other home appliances 580. The communication unit 500 may include one or more components that communicate with the external other home appliances 580. For example, the communication unit 500 may include a short-range communication module 510, a wired communication module 520, and a mobile communication module 530.

The short-range communication module 510 may be a module for short-range communication within a predetermined distance. As examples of short-range communication technologies, wireless LAN, Wi-Fi, Bluetooth™, Zigbee™, W-Fi direct (WFD), ultra wideband (UWB), infrared communication (IrDA, infrared data association), Bluetooth low energy (BLE), or near field communication (NFC), and the like may be used, but the short-range communication technologies are not limited thereto.

The wired communication module 520 may be defined as a module for communication using electrical signals and/or optical signals. As examples of the wired communication technologies, a pair cable, a coaxial cable, an optical fiber cable, an Ethernet cable, and the like may be used, but the wired communication technologies are not limited thereto.

The mobile communication module 530 may transmit and receive radio signals to and/or from at least one of a base station, an external terminal, and the server 550 on a mobile communication network. The radio signals may include voice call signals, video communication call signals, or various types of data according to text/multimedia message transmission and reception.

The user interface 120 may be provided on a front surface of the main body 10, and receive, from a user, an output level selection command for adjusting the strength of the magnetic field B generated by each of the induction heating coils L, as well as an input of the power supply, a control command such as start/stop of an operation, or the like.

The output level may be obtained by discretely dividing the strength of the magnetic field B generated by each of the induction heating coils L. The strength of the magnetic field B corresponds to the magnitude of a current applied to the induction heating coils L, and therefore the output level may be obtained by discretely dividing the magnitude of the current applied to the induction heating coils L. The output level may be divided into a plurality of levels, and for example, divided into a level 0 to a level 10. As the output level becomes higher, that is, as the output level is close to the level 10, the induction heating coils L may be set to generate a relatively large magnetic field B, and therefore the cooking vessel C may be more rapidly heated. As a the output level becomes lower, the induction heating coils L may be set to generate a relatively small magnetic field B.

Each of the levels may be defined, for example, by dividing the magnitude of the applied current at regular intervals. In other words, a difference in currents between the respective levels may be the same. For example, the applied current of the level 0 may be defined as 0 A and a difference in currents corresponding to each of the level 1 to the level 10 may be defined as 1.6 A. In this case, the level 10 may be defined as 16 A. According to an embodiment, a difference in currents between the respective levels may be arbitrarily defined according to the designer's selection. According to at least one exemplary embodiment, the difference in currents between the respective levels may not be the same. For example, a part of the difference in currents between the respective levels may be larger than a difference in currents between other levels.

The user interface 120 may include an input unit 128 that receives various control commands from a user, and a display 129 that displays an operating state of the cooking apparatus to a user or allows the user to recognize input buttons.

The input unit 128 may be implemented using, for example, physical buttons, touch buttons, a touchpad, a knob, a jog shuttle, an operating stick, a trackball, a trackpad, and the like.

The display 129 may be implemented by adopting, for example, a liquid crystal display (LCD), a light emitting diode (LED), an organic LED (OLED), or the like.

The user interface 120 may include a touch screen panel (TSP) in which the input unit 128 and the display 129 are integrally implemented.

As illustrated in FIG. 5, the user interface may include, for example, a power button 121, a burner selection button 122, an output level adjustment button 123, a hot insulation button 124, and a timer button 125. According to at least one embodiment, at least one button thereof may be omitted according to the designer's selection, and at least one other button may be further added according to the designer's selection.

According to at least one embodiment, the power button 121 is a button to receive a user's control command for turning on/off the entire power of the cooking apparatus. When a user for example, touches the power button 121, the power of the cooking apparatus is turned on, and when the user for example, again touches the power button 121, the power of the cooking apparatus is turned off.

According to at least one embodiment, the burner selection button 122 is a button to select a burner to be controlled among a plurality of burners by a user. The user may select one of the three burner selection buttons 122 to select a burner to be controlled, and thereby may control the corresponding burner using the output level adjustment button 123, the hot insulation button 124, the timer button 125, and the like. The burner selection button 122 may include a high power burner selection button SM1, a first low power burner selection button SM2, and a second low power burner selection button SM3.

According to at least one embodiment, the high power burner selection button SM1 is the burner selection button to select a high power burner HB to control the high power burner HB, the first low power burner selection button SM2 is the burner selection button to select a first low power burner LB1 in order to control the first low power burner LB1, and the second low power burner selection button SM3 is the burner selection button for selecting a second low power burner LB2 in order to control the second low power burner LB2.

The output level adjustment button 123 may be provided at the center of the user interface 120 to adjust an output level of the corresponding burner selected through the burner selection button 122 among the plurality of burners and display an input output level. A user may select the burner to be controlled, and increase or reduce the output of the corresponding burner. The input output level of the corresponding burner may be displayed so as to be recognized by the user. The output level adjustment button 123 may include an output level increase button LIB, an output level reduction button LRB, an output level display unit 123*a*, and output level dials 123*b*, 123*c*, and 123*d*.

The output level increase button LIB may be provided to increase the output level of the corresponding burner according to a user's operation, and for example, may be provided on the right side of the output level adjustment button 123. The output level reduction button LRB may be provided to reduce the output level of the corresponding burner according to the user's operation, and for example, may be provided on the left side of the output level adjustment button 123.

The output level display unit 123*a* may display the output level of the corresponding burner input through the output level increase button LIB or the output level reduction button LRB using numerical values, so that the user may recognize the output level of the corresponding burner.

The output level dials 123*b*, 123*c*, and 123*d* may display the degree of the output level by dials such as high, medium, and low according to the output level of the corresponding burner input through the output level increase button LIB or the output level reduction button LRB, so that the user may recognize the output level of the corresponding burner.

The output level dials 123*b*, 123*c*, and 123*d* may include a first output level dial 123*b*, a second output level dial 123*c*, and a third output level dial 123*d*. The first output level dial 123*b* may display the degree of the input output level as low, the second output level dial 123*c* may display the degree of the input output level as medium, and the third output level dial 123*d* may display the degree of the input output level as high.

According to at least one embodiment, the hot insulation button 124 is a button for maintaining the temperature of a vessel provided in the corresponding burner, and the timer button 125 is a button for terminating the operation of the corresponding burner at a time set by the user.

Hereinafter, with reference to FIGS. 6 to 10C, an example in which power of a plurality of AC power supply units is provided to a high power burner will be described.

Figure 6:
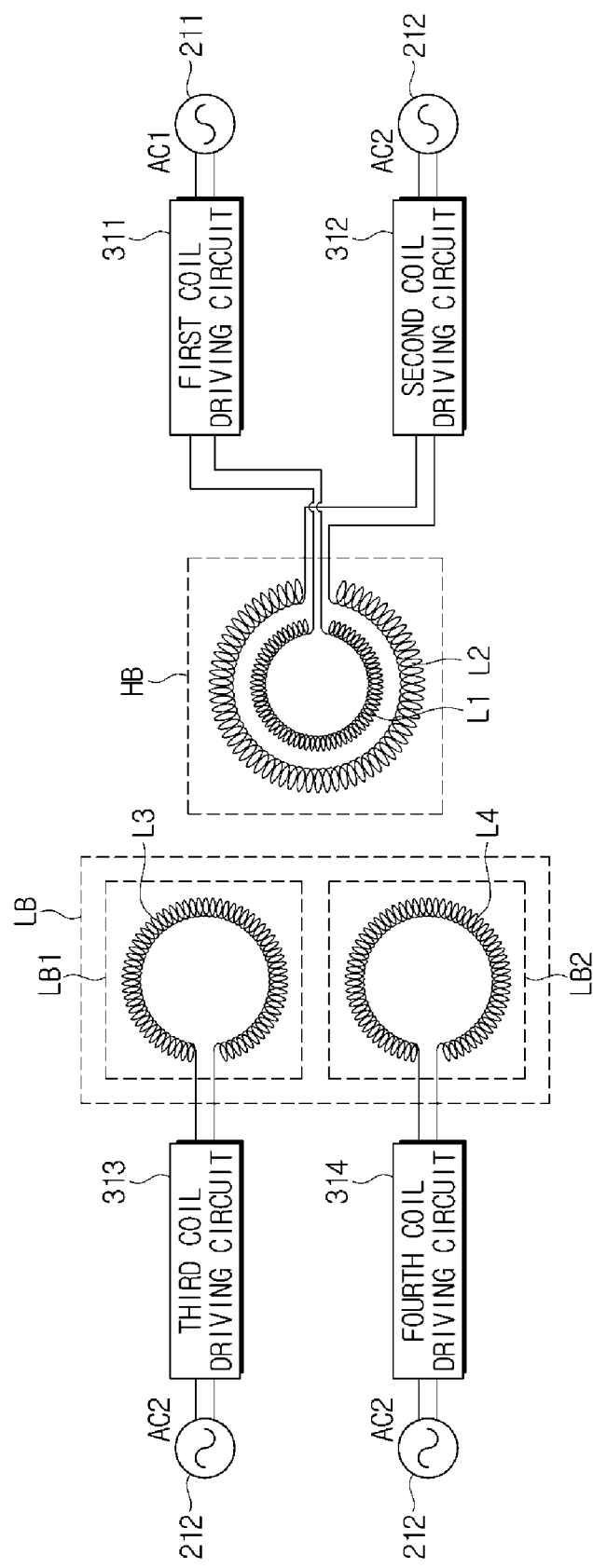
FIG. 6 is a conceptual diagram illustrating a cooking apparatus in accordance with at least one exemplary embodiment.

FIG. 6 illustrates an exemplary cooking apparatus.

As illustrated in FIG. 6, four heating coils may be provided in the cooking apparatus. Two heating coils of the four heating coils may be concentric and form, for example, a high power burner HB. According to at least one embodiment, any one coil L1 of the two heating coils L1 and L2 forming the high power burner HB may be provided inside the other coil L2. The other two heating coils L3 and L4 may respectively form a low power burner LB. Each of the heating coils may be provided to form low power burners LB1 and LB2.

The four heating coils may be connected to a coil driving circuit that generates and supplies a driving power supply. One heating coil L1 of the high power burner HB may be connected to a first coil driving circuit 311, and the other heating coil L2 of the high power burner HB may be connected to a second coil driving circuit 312. The heating coil L3 of the first low power burner LB1 may be connected to a third coil driving circuit 313, and the heating coil L4 of the second low power burner LB2 may be connected to a fourth coil driving circuit 314.

The independent coil driving circuits 311 to 314 connected to the individual heating coils L1 to L4 may receive an input power supply for generating a driving power supply from the AC power supply unit 210. According to an exemplary embodiment, AC power supplies of two different phases may be supplied. The two heating coils L3 and L4 of the low power burner LB and one heating coil L2 of the high power burner HB may receive an AC power supply in a single phase, and the other heating coil L1 of the high power burner HB may receive an AC power supply in a different phase. The heating coil L1 connected to the first coil driving circuit 311 among the heating coils of the high power burner HB may receive the AC power supply of the first AC power supply unit 211. The heating coil L2 connected to the second coil driving circuit 312 among the heating coils of the high power burner HB and the two heating coils L3 and L4 of the low power burner LB may receive the AC power supply of the second AC power supply unit 212.

Figure 7:
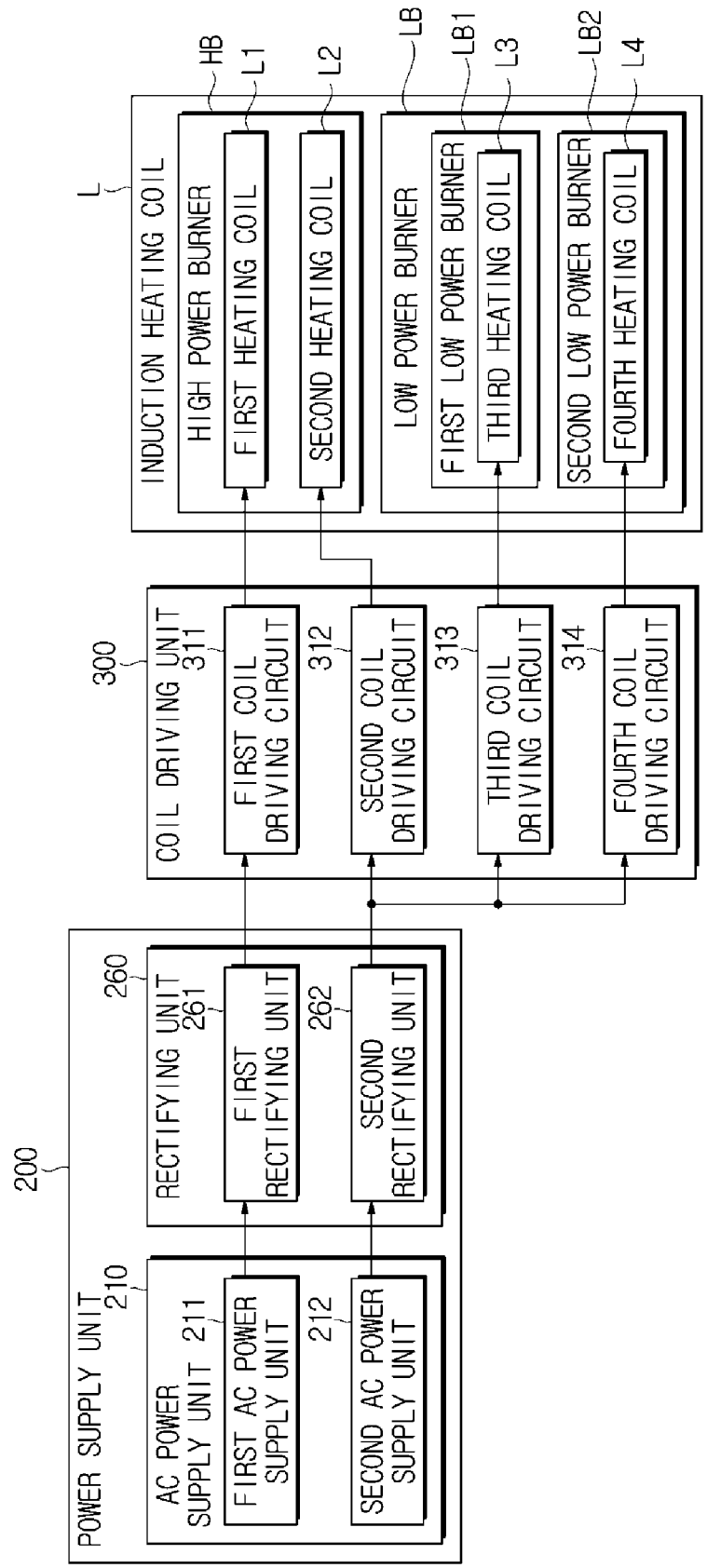
FIG. 7 is a block diagram illustrating a cooking apparatus in accordance with at least one exemplary embodiment.

FIG. 7 is a block diagram illustrating a cooking apparatus in accordance with a first embodiment of the at least one exemplary embodiment.

As illustrated in FIG. 7, induction heating coils L may include a high power burner HB having a high output and a low power burner LB having a low output. The high power burner HB may include a first heating coil L1 and a second heating coil L2. The low power burner LB may include a first low power burner LB1 having a third heating coil L3 and a second low power burner LB2 having a fourth heating coil L4.

When a power supply with the same power is supplied to each of the heating coils L1 to L4, the output of the high power burner HB may be relatively higher than the output of the low power burners LB1 and LB2. The right way high power burner HB may be set to have an output approximately twice that of the low power burner LB, but a ratio between the output of the high power burner HB and the output of the low power burner LB is not limited thereto. The ratio between the output of the high power burner HB and the output of the low power burner LB may be variously given according to a designer's arbitrary selection.

The power supply unit 200 may include the AC power supply unit 210 that generates an AC power supply and the rectifying unit 260 that rectifies and smooths the AC power supply generated by the AC power supply unit 210. The first AC power supply unit 211 transmits the generated AC power supply to a first rectifying unit 261, and the first rectifying unit 261 converts the AC power supply into a DC power supply and transmits the DC power supply to the first coil driving circuit 311. The second AC power supply unit 212 transmits the generated AC power supply to a second rectifying unit 262, and the second rectifying unit 262 converts the AC power supply into a DC power supply, distributes the DC power supply in parallel, and transmits the distributed DC power supply to the second coil driving circuit 312, the third coil driving circuit 313, and the fourth coil driving circuit 314. That is, according to the first embodiment of the at least one exemplary embodiment, the second coil driving circuit 312, the third coil driving circuit 313, and the fourth coil driving circuit 314 may share the DC power supply of the second rectifying unit 262.

The coil driving unit 300 converts the DC power supply into a high frequency power supply based on the DC power supply provided by the power supply unit 200 and a control signal transmitted from the control unit 100, that is, an operation frequency command, and transmits the high frequency power supply to the induction heating coils L. The first coil driving circuit 311 may supply the high frequency power supply to the first heating coil L1, the second coil driving circuit 312 may supply the high frequency power supply to the second heating coil L2, the third coil driving circuit 313 supplies the high frequency power supply to the third heating coil L3, and the fourth coil driving circuit 314 may supply the high frequency power supply to the fourth heating coil L4.

The coil driving unit 300 may distribute power introduced into the second coil driving circuit 312, the third coil driving circuit 313, and the fourth coil driving circuit 314 according to the control signal of the control unit 100. The control unit 100 may control the coil driving unit 300 in such a manner as to set a heating coil having a priority among the second heating coil to the fourth heating coil L2 to L4 based on power to be consumed by the first heating coil to the fourth heating coil L1 to L4, provide the power required by the corresponding heating coil to the heating coil having a priority, and supply the remaining power out of the maximum power of the second AC power supply unit 212 to the remaining heating coils.

For example, when a maximum rated current of the second AC power supply unit 212 is 16 A, the second heating coil L2 has a priority, and the currents required by the second heating coil L2 to the fourth heating coil L4 are all 10 A, the control unit 100 may control the coil driving unit 300 in such a manner that 10 A may be supplied to the second heating coil L2, 3 A is supplied to the third heating coil L3, and 3 A may be supplied to the fourth heating coil L4.

When the maximum rated current of the second AC power supply unit 212 is 16 A, the third heating coil L3 may have a priority, and the currents required by the second heating coil L2 to the fourth heating coil L4 are all 10 A, the control unit 100 may control the coil driving unit 300 in such a manner that 3 A may be supplied to the second heating coil L2, 10 A may be supplied to the third heating coil L3, and 3 A may be supplied to the fourth heating coil L4.

Figure 8:
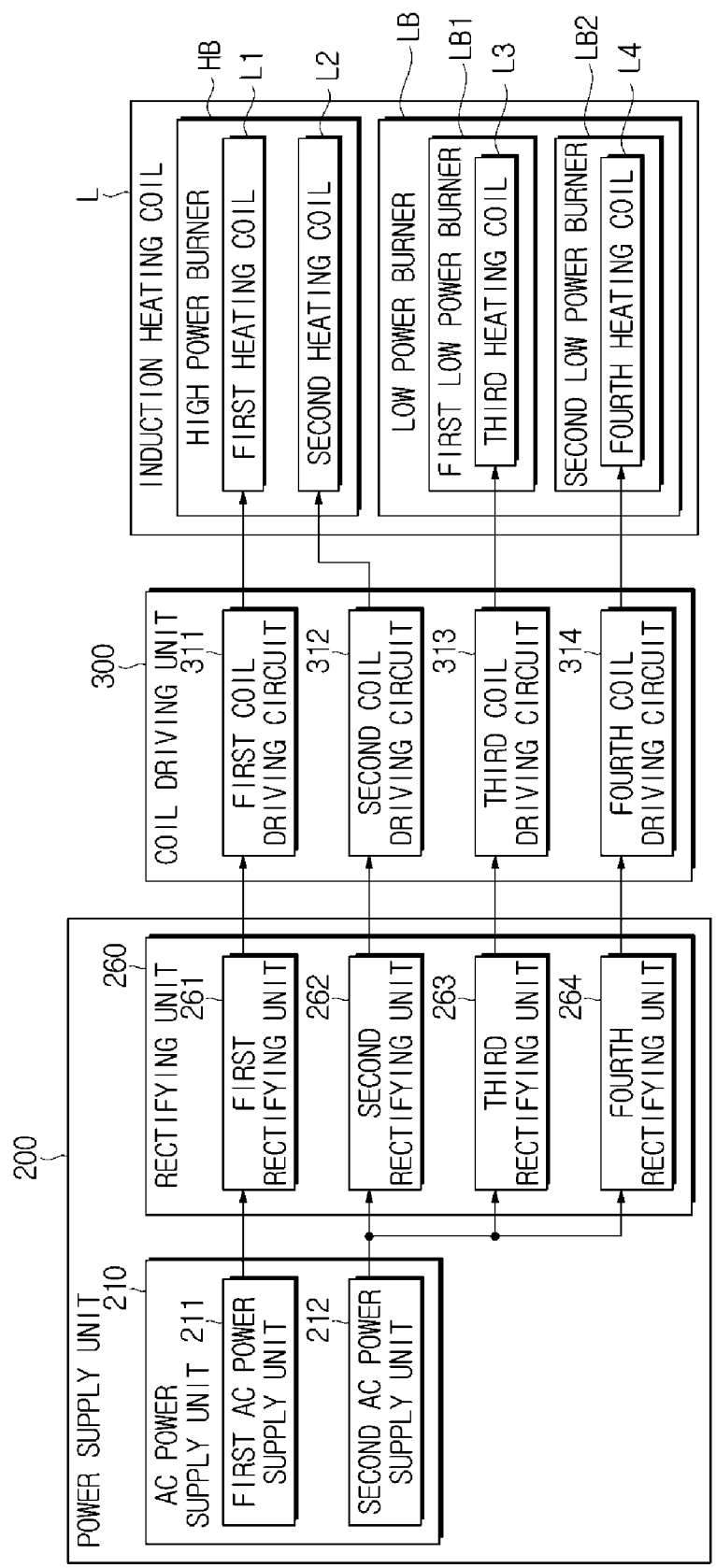
FIG. 8 is a block diagram illustrating a cooking apparatus in accordance with at least one exemplary embodiment.

FIG. 8 is a block diagram illustrating a cooking apparatus according to a least one exemplary embodiment.

In at least one exemplary embodiment which has been described with reference to FIG. 7, a DC power supply of the power supply unit 200 is shared, but in the second embodiment of the at least one exemplary embodiment, an AC power supply is shared.

As illustrated in FIG. 8, the rectifying unit 260 included in the power supply unit 200 may include the first rectifying unit 261, the second rectifying unit 262, a third rectifying unit 263, and a fourth rectifying unit 264. In the same manner as that in the first embodiment, the AC power supply generated by the first AC power supply unit 211 may be introduced into the first rectifying unit 261. However, the AC power supply generated by the second AC power supply unit 212 may be divided into three branches, and the divided AC power supply is respectively introduced into the second rectifying unit 262, the third rectifying unit 263, and the fourth rectifying unit 264.

Figure 9A:
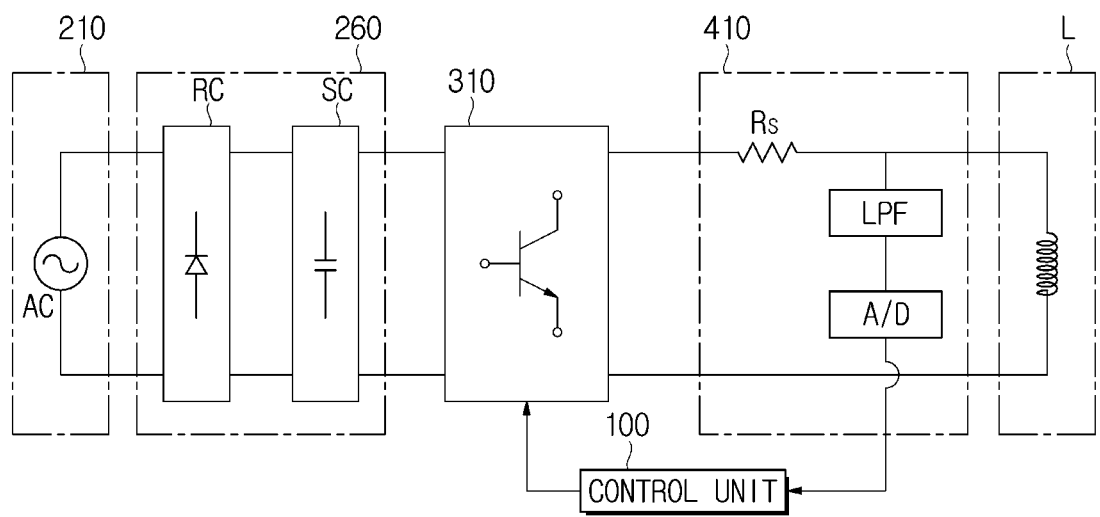
FIG. 9A is a block diagram illustrating a single heating coil of a cooking apparatus in accordance with at least one exemplary embodiment.
Figure 9B:
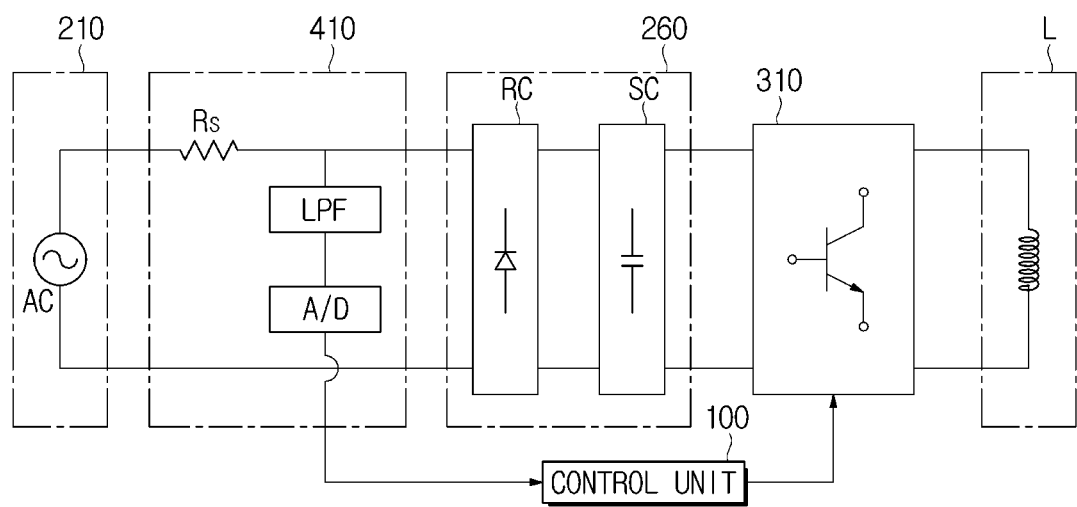
FIG. 9B is a block diagram illustrating a single heating coil of a cooking apparatus in accordance with at least one exemplary embodiment.
Figure 9C:
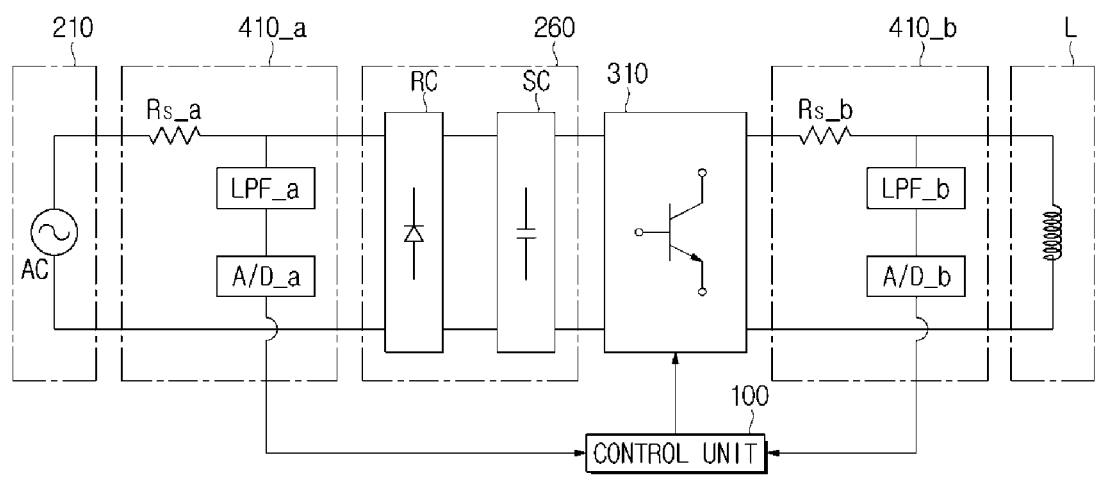
FIG. 9C is a block diagram illustrating a single heating coil of a cooking apparatus in accordance with at least one exemplary embodiment.

FIG. 9A is a block diagram illustrating a single heating coil of a cooking apparatus in accordance with at least one exemplary embodiment, FIG. 9B is a block diagram illustrating a single heating coil of a cooking apparatus in accordance with at least one exemplary embodiment, and FIG. 9C is a block diagram illustrating a single heating coil of a cooking apparatus in accordance with at least one exemplary embodiment.

As described with reference to FIG. 4, the power supply unit 200 may include the AC power supply unit 210 that converts an external AC power supply into a three-phase AC power supply and the rectifying unit 260 that rectifies and smoothes the AC power supply. The cooking apparatus 1 may include the coil driving circuit 310 that generates a high frequency driving power supply and the induction heating coils L that supply an eddy current to a cooking vessel.

In a node between the AC power supply unit 210 and the rectifying unit 260 or a node between the coil driving circuit 310 and the induction heating coils L, the current detection unit 410 that detects the current of the driving power supply consumed by the induction heating coils L is provided.

The current detection unit 410 may measure the current supplied to the induction heating coils L and determine power to be consumed in the induction heating coils L.

The current detection unit 410 may be positioned between the AC power supply unit 210 and the rectifying unit 260 to detect power of an input power supply supplied by the AC power supply unit 210, and positioned between the coil driving circuit 310 and the induction heating coils L to detect power of a driving power supply supplied by the coil driving circuit 310.

The current detection unit 410 may be provided in at least one of the node between the AC power supply unit 210 and the rectifying unit 260 and the node between the coil driving circuit 310 and the induction heating coils L. For example, the current detection unit 410 may be provided in the node between the coil driving circuit 310 and the induction heating coils L, as illustrated in the embodiment of FIG. 9A. The current detection unit 410 may be provided in the node between the AC power supply unit 210 and the rectifying unit 260, as illustrated in the other embodiment of FIG. 9B. The current detection unit 410 may be provided in the node between the AC power supply unit 210 and the rectifying unit 260 and the node between the coil driving circuit 310 and the induction heating coils L, as illustrated in the embodiment of FIG. 9C.

The current detection unit 410 may include a shunt resistor RS to detect the magnitude of a current flowing in the rectifying unit 260 or an input terminal of the induction heating coils L, a low pass filter LPF to remove a noise component included in current signals of the input terminal of the coil driving circuit, and an analog-to-digital (A/D) converter that converts analog current signals from which the noise component is removed into digital signals and outputs signals corresponding to a phase current flowing in the coil driving circuit.

The current detection unit 410 may include a current transformer (CT) that proportionally reduces the magnitude of a current and an ampere meter that detects the proportionally reduced magnitude of the current.

The control unit 100 may control the coil driving circuit according to the current detected by the current detection unit 410, and the coil driving circuit may supply a driving power supply of a specific frequency to the induction heating coils L according to the control signal of the control unit 100.

Figure 10A:
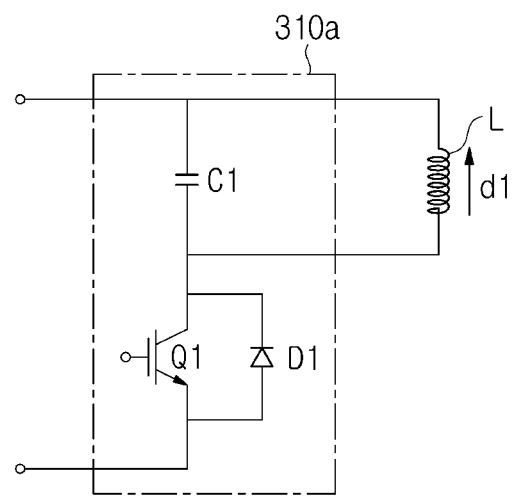
FIG. 10A is a circuit diagram illustrating a coil driving circuit in accordance with at least one exemplary embodiment.

FIG. 10A is a circuit diagram illustrating a coil driving circuit in accordance with one embodiment of the at least one exemplary embodiment.

A coil driving circuit 310a may have a single switch form as illustrated in FIG. 10A.

For example, the coil driving circuit 310a may include a single capacitor C1 connected in parallel to an output terminal, and a single switch Q1 may be connected in series between a node on the capacitor C1 side and a node on the ground side, below the single capacitor C1.

The coil driving circuit 310a may supply an AC driving current to the induction heating coils L according to ON/OFF of the switch Q1.

When the switch Q1 is turned ON, a driving current is supplied from the capacitor C1 to the induction heating coils L. The driving current at this time flows from the upper side of the induction heating coils L in a downward direction d1, on the basis of information illustrated in FIG. 10A.

Figure 10B:
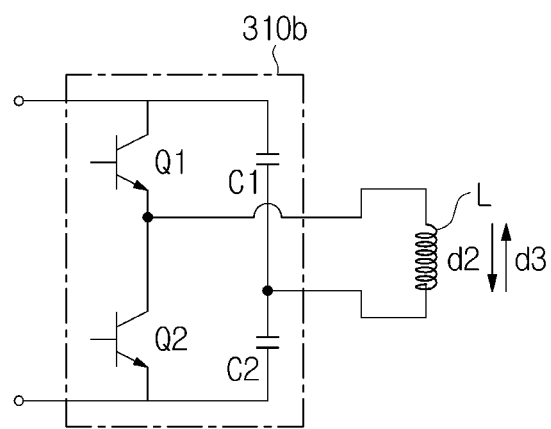
FIG. 10B is a circuit diagram illustrating a coil driving circuit in accordance with at least one exemplary embodiment.
Figure 10C:
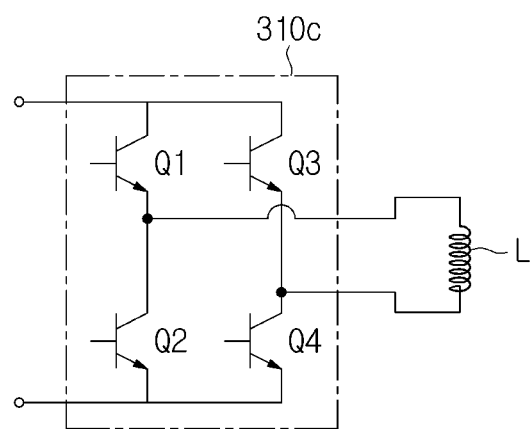

FIG. 10B is a circuit diagram illustrating a coil driving circuit in accordance with another embodiment of the at least one exemplary embodiment.

A coil driving circuit 310b may have a half bridge form as illustrated in FIG. 10B.

For example, the coil driving circuit 310b includes a pair of switches Q1 and Q2 connected in series to each other and a pair of capacitors C1 and C2 connected in series to each other, and the pair of switches Q1 and Q2 and the pair of capacitors C1 and C2 are connected in parallel to each other. In addition, both ends of the induction heating coils L may be respectively connected to a node to which the pair of switches Q1 and Q2 are connected in series and a node to which the pair of capacitors C1 and C2 are connected in series.

The pair of switches Q1 and Q2 connected in series to each other may include an upper switch Q1 and a lower switch Q2, and the pair of capacitors C1 and C2 connected in series to each other may include an upper capacitor C1 and a lower capacitor C2.

The coil driving circuit 310b may supply an AC driving current to the induction heating coils L according to ON/OFF states of the upper switch Q1 and the lower switch Q2.

When the upper switch Q1 is turned ON and the lower switch Q2 is turned OFF, the driving current flows from the upper side of the induction heating coils L in a downward direction d2, on the basis of information illustrated in FIG. 10B.

On the other hand, when the upper switch Q1 is turned OFF and the lower switch Q2 is turned ON, the driving current flows from the lower side of the induction heating coils L in an upward direction d3, on the basis of information illustrated in FIG. 10B.

FIG. 100 is a circuit diagram illustrating a coil driving circuit in accordance with an embodiment of the at least one exemplary embodiment.

A coil driving circuit 310c may have a full bridge form as illustrated in FIG. 100.

For example, the coil driving circuit 310c includes a pair of switches Q1 and Q2 connected in series to each other and another pair of switches Q3 and Q4 connected in series to each other, and the pair of switches Q1 and Q2 and the other pair of switches Q3 and Q4 are connected in parallel to each other. Both ends of the induction heating coils L may be respectively connected to a node to which the pair of switches Q1 and Q2 are connected in series and a node to which the other pair of switches Q3 and Q4 are connected in series.

The pair of switches Q1 and Q2 connected in series to each other may include an upper switch Q1 and a lower switch Q2, and the other pair of switches Q3 and Q4 may include an upper switch Q3 and a lower switch Q4.

The coil driving circuit 310c may supply an AC driving current to the induction heating coils L according to ON/OFF of the upper switch Q1 and the lower switch Q2.

Figure 11:
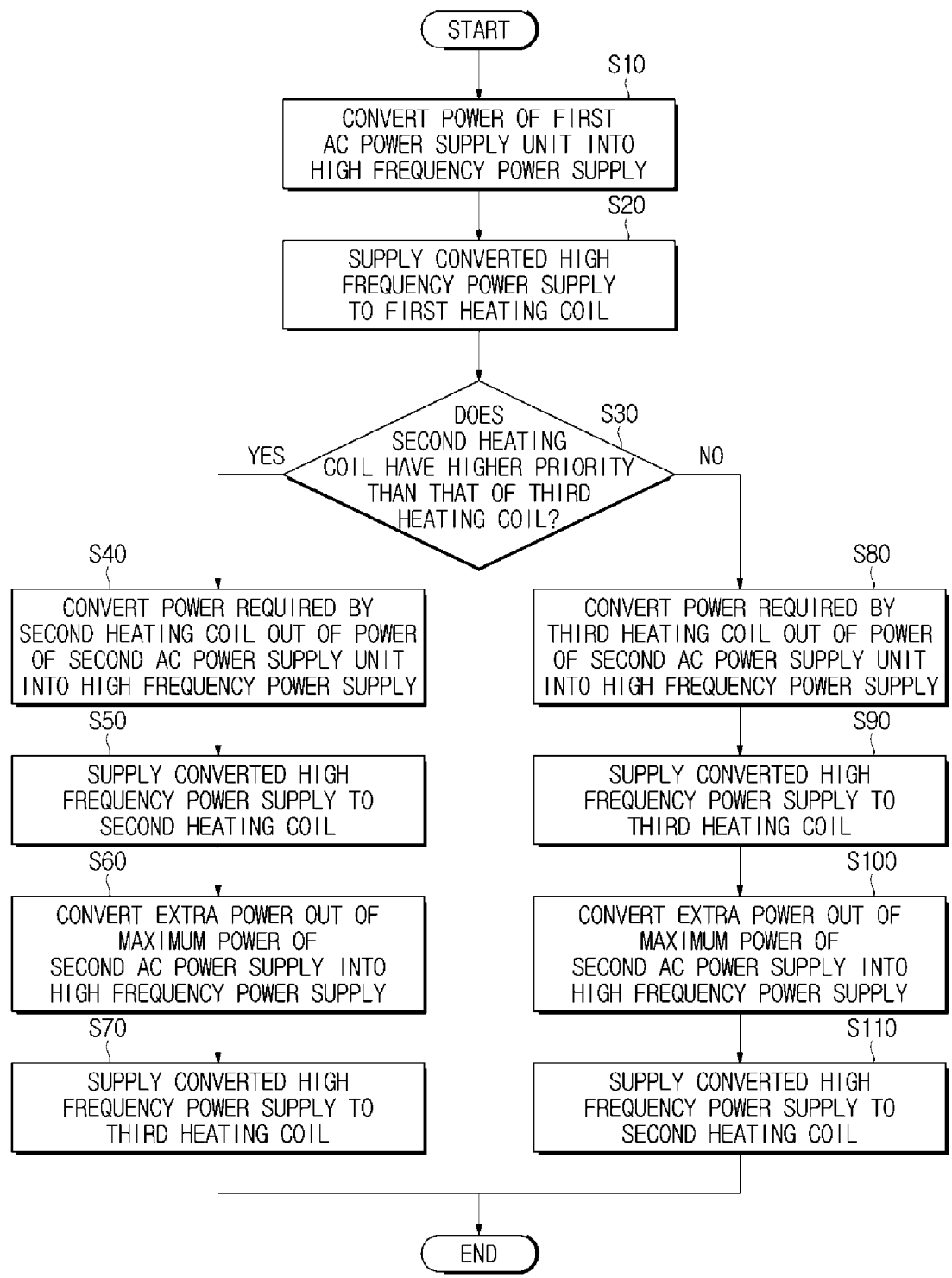
FIG. 11 is a flowchart illustrating a method of determining priorities of a high power burner and a low power burner and providing power to heating coils in accordance with at least one exemplary embodiment.

FIG. 11 is a flowchart illustrating a method of determining priorities of a high power burner and a low power burner and providing power to heating coils in at least one exemplary embodiment.

A first coil driving circuit converts power of a first AC power supply unit into a high frequency power supply in operation S10, and supplies the converted high frequency power supply to a first heating coil in operation S20.

In operation S30, a control unit determines whether a second heating coil has a higher priority than that of a third heating coil based on a user's command, data stored in a storage unit, and the user's usage pattern.

When the second heating coil is set to have the higher priority than that of the third heating coil, a current distributor distributes a current so that power required by the second heating coil is supplied, and a second coil driving circuit converts the power required by the second heating coil out of power of a second AC power supply unit into a high frequency power supply in operation S40 and supplies the converted high frequency power supply to the second heating coil in operation S50. A third coil driving circuit converts the remaining power out of the maximum power of the second AC power supply unit in operation S60, and supplies the converted high frequency power supply to the third heating coil in operation S70.

When the second heating coil is not set to have the higher priority than that of the third heating coil, the current distributor distributes a current so that power required by the third heating coil is supplied, and the third coil driving circuit converts the power required by the third heating coil out of the power of the second AC power supply unit into a high frequency power supply in operation S80, and supplies the converted high frequency power supply to the third heating coil in operation S90. The second coil driving circuit converts the remaining power out of the maximum power of the second AC power supply unit into a high frequency power supply in operation S100, and supplies the converted high frequency power supply to the second heating coil in operation S110.

An example in which a coil driving circuit is provided in each of heating coils to control the heating coils will be described with reference to FIGS. 12 and 13.

Figure 12:
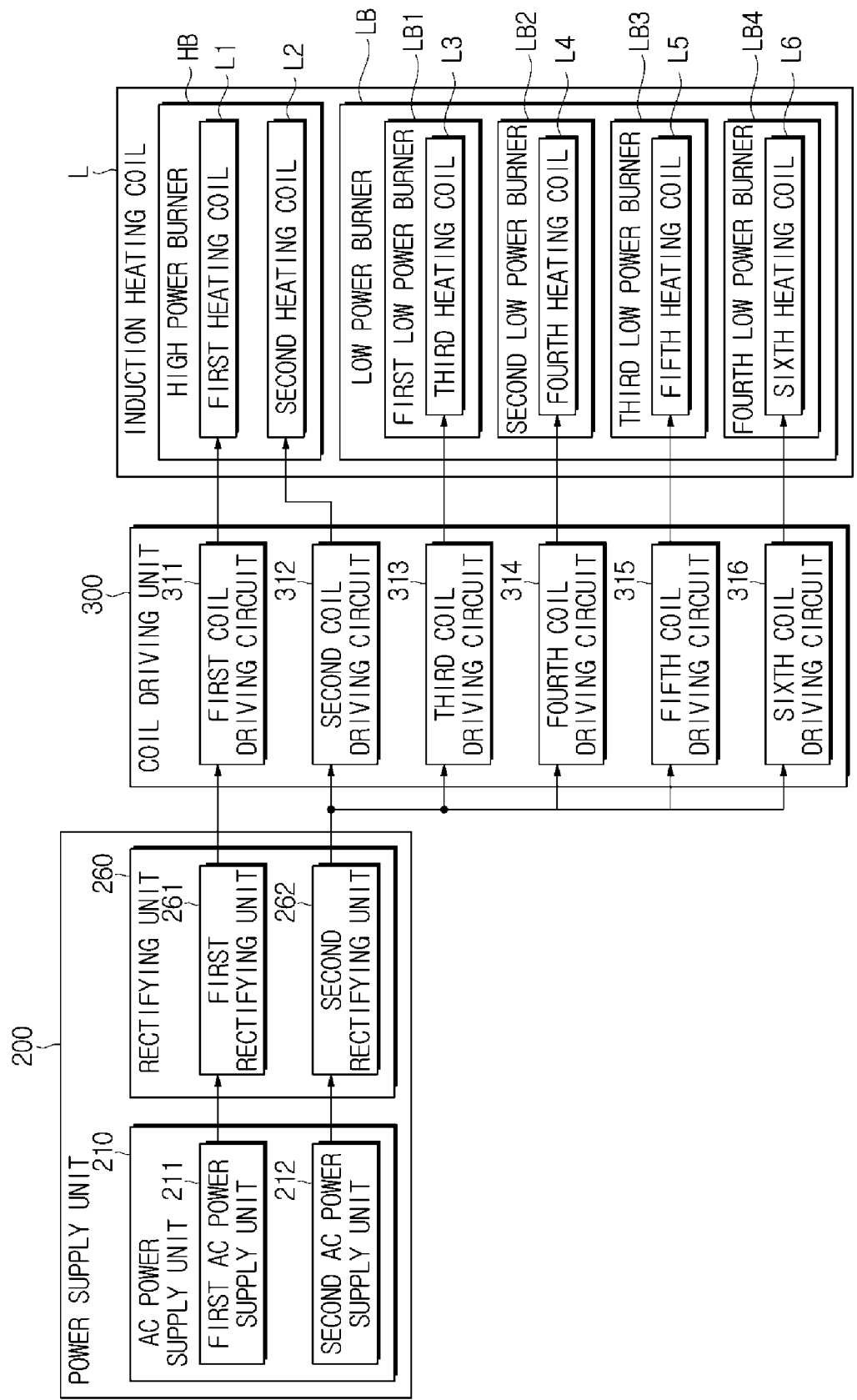
FIG. 12 is a block diagram illustrating a cooking apparatus in accordance with at least one exemplary embodiment.

FIG. 12 is a block diagram illustrating a cooking apparatus in accordance with at least one exemplary embodiment.

As illustrated in FIG. 12, induction heating coils L may include a high power burner HB having a high output and a low power burner LB having a low output. The high power burner HB includes a first heating coil L1 and a second heating coil L2, and has an output twice that of the low power burner LB having a single heating coil. The low power burner LB may include a first low power burner LB1 having a third heating coil L3, a second low power burner LB2 having a fourth heating coil L4, a third low power burner LB3 having a fifth heating coil L5, and a fourth low power burner LB4 having a sixth heating coil L6.

The power supply unit 200 may include the AC power supply unit 210 that generates an AC power supply and the rectifying unit 260 that rectifies and smoothes the AC power supply generated by the AC power supply unit 210. The first AC power supply unit 211 transmits the generated AC power supply to the first rectifying unit 261, and the first rectifying unit 261 converts the AC power supply to a DC power supply and transmits the converted DC power supply to the first coil driving circuit 311. The second AC power supply unit 212 transmits the generated AC power supply to the second rectifying unit 262, and the second rectifying unit 252 converts the AC power supply into a DC power supply, distributes the converted DC power supply in parallel, and transmits the distributed DC power supply to the second coil driving circuit 312 to the sixth coil driving circuit 316. That is, in least one exemplary embodiment, the DC power supply of the second rectifying unit 262 may be shared.

The coil driving unit 300 converts a DC power supply into a high frequency power supply based on a DC power supply provided by the power supply unit 200 and an operation frequency command, and transmits the converted high frequency power supply to the induction heating coils L. The first coil driving circuit 311 may supply a high frequency power supply to the first heating coil L1, the second coil driving circuit 312 may supply a high frequency power supply to the second heating coil L2, the third coil driving circuit 313 may supply a high frequency power supply to the third heating coil L3, the fourth coil driving circuit 314 may supply a high frequency power supply to the fourth heating coil L4, the fifth coil driving circuit 315 may supply a high frequency power supply to the fifth heating coil L5, and the sixth coil driving circuit 316 may supply a high frequency power supply to the sixth heating coil L6.

The coil driving unit 300 may selectively control operations of the second heating coil to the sixth heating coil L2 to L6 according to control signals of the control unit 100.

For a plurality of heating coils to be selectively operated, the operation of each burner may be controlled through switching on an output side of the coil driving unit 300. However, when the operation of each burner is controlled through switching on the output side, a surge voltage and noise may be generated due to switching of a node to which the high frequency power supply is supplied. Thus, it is possible to control the operation of each burner through control of the coil driving circuit of the coil driving unit 300. That is, the control unit 100 may control the switch of the coil driving circuit and thereby may or may not supply a driving power supply to the induction heating coils L.

For example, to operate the first low power burner LB1, the control unit 100 may control the driving power supply to be supplied to the third heating coil L3 by turning on the switch of the third coil driving circuit 313 and turning off the switches of the fourth coil driving circuit 314 to the sixth coil driving circuit 316.

The coil driving unit 300 may select one heating coil among the first heating coil to the sixth heating coil L1 to L6 and supply the driving power supply to the selected heating coil, but select a plurality of heating coils among the first heating coil to the sixth heating coil L1 to L6 and supply the driving power supply to the selected heating coils.

For example, to operate the second low power burner LB2 and the third low power burner LB3, the control unit 100 may control the driving power supply to be supplied to the fourth heating coil L4 and the fifth heating coil L5 by turning on the switches of the fourth coil driving circuit 314 and the fifth coil driving circuit 315 and turning off the switches of the third coil driving circuit 313 and the sixth coil driving circuit 316.

Figure 13:
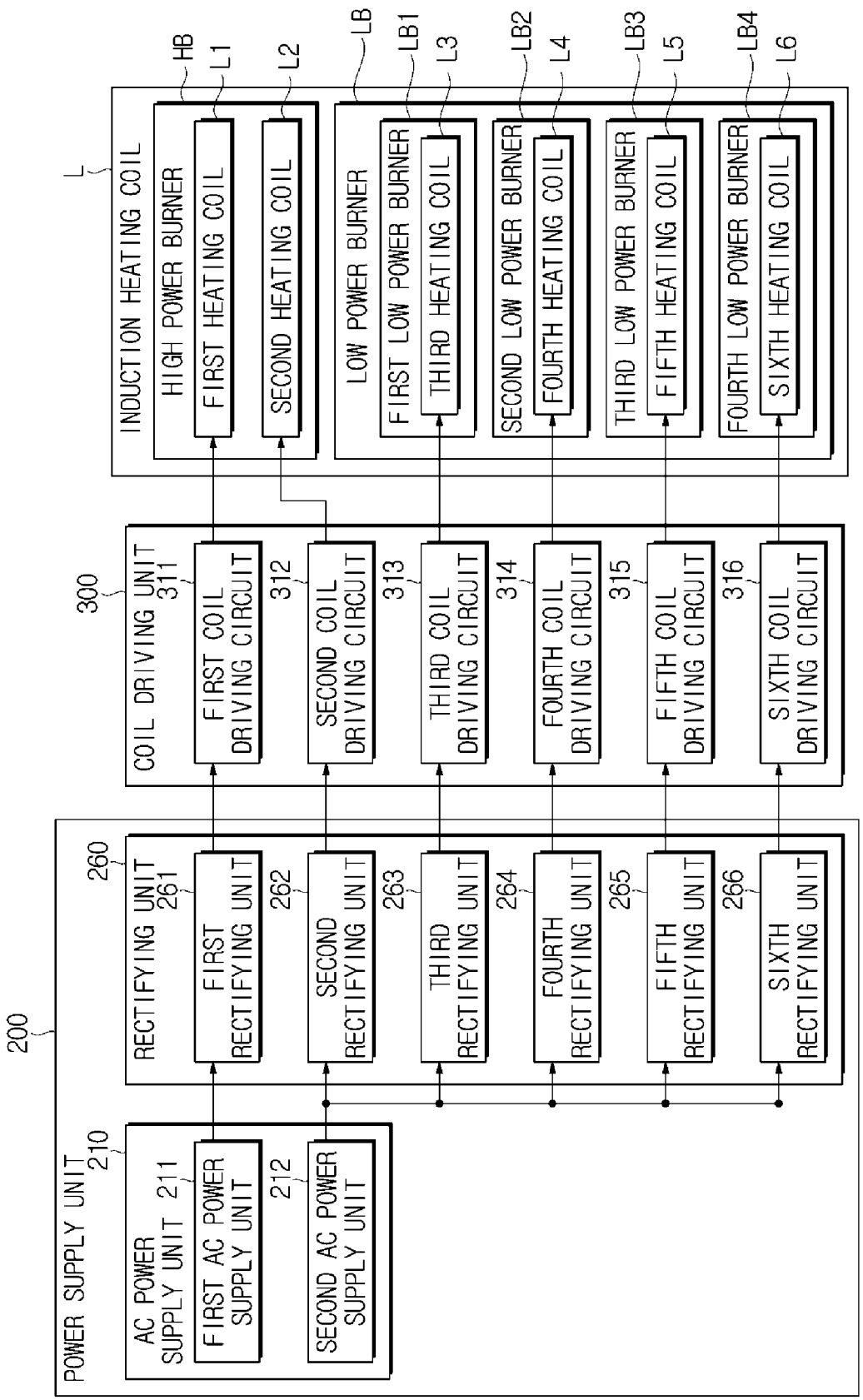
FIG. 13 is a block diagram illustrating a cooking apparatus in accordance with at least one exemplary embodiment.

FIG. 13 is a block diagram illustrating a cooking apparatus in accordance with at least one exemplary embodiment.

In the embodiment described with reference to FIG. 12, a DC power supply of the power supply unit 200 is shared, but according to at least embodiment, an AC power supply may be shared.

As illustrated in FIG. 13, the rectifying unit 260 included in the power supply unit 200 may include the first rectifying unit 261, the second rectifying unit 262, the third rectifying unit 263, the fourth rectifying unit 264, a fifth rectifying unit 265, and a sixth rectifying unit 266. The AC power supply generated by the first AC power supply unit 211 may be introduced into the first rectifying unit 261 in the same manner as in the first embodiment. However, the AC power supply generated by the second AC power supply unit 212 is divided into five branches, and the divided AC power supply is respectively introduced into the second rectifying unit 262, the third rectifying unit 263, the fourth rectifying unit 264, the fifth rectifying unit 265, and the sixth rectifying unit 266.

An example in which one or more heating coils are converted and connected to another AC power supply unit different from a preset AC power supply unit will be described with reference to FIGS. 14 to 25C.

Figure 14:
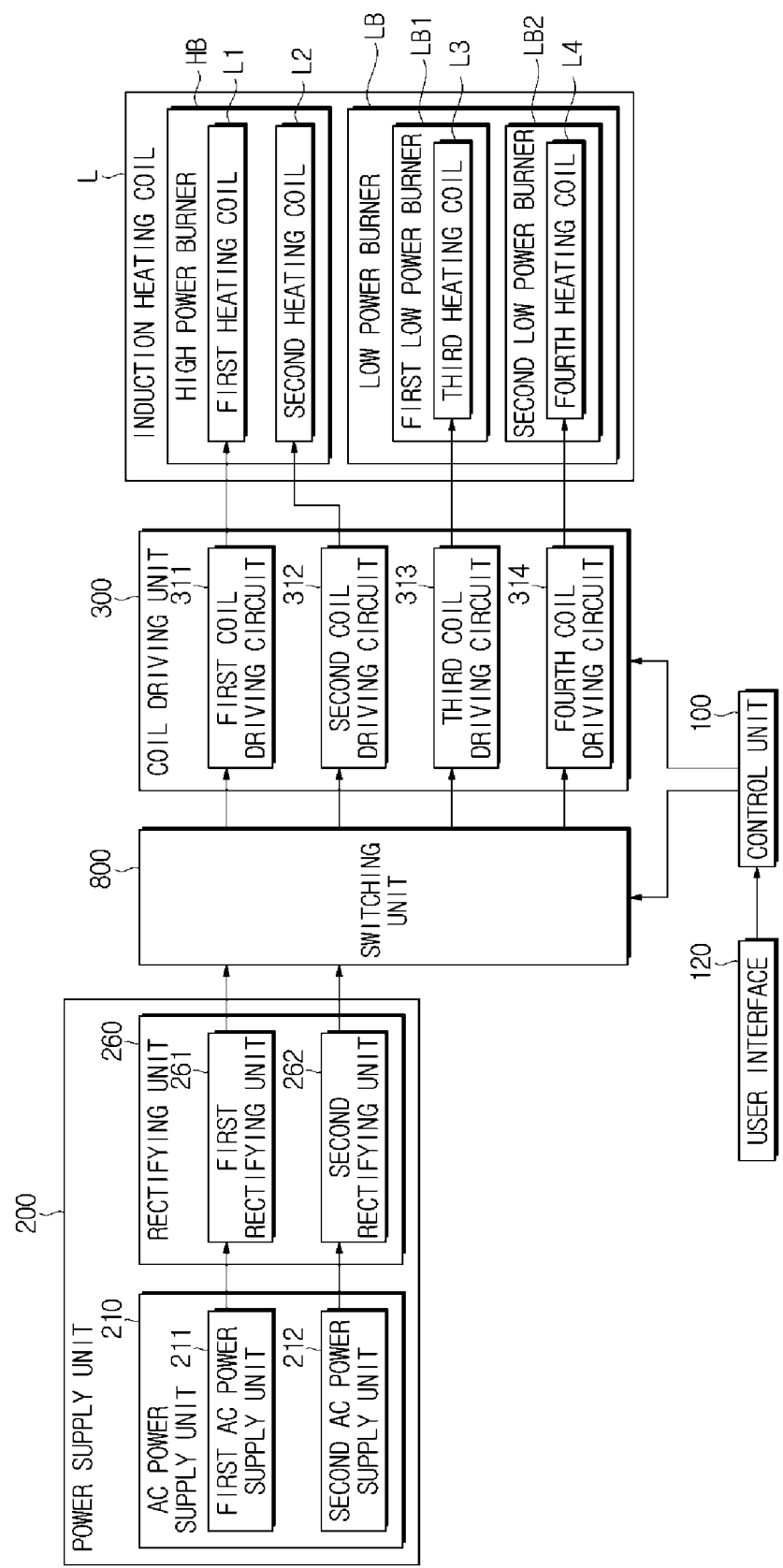
FIG. 14 is a block diagram illustrating a cooking apparatus in accordance with at least one exemplary embodiment.
Figure 15A:
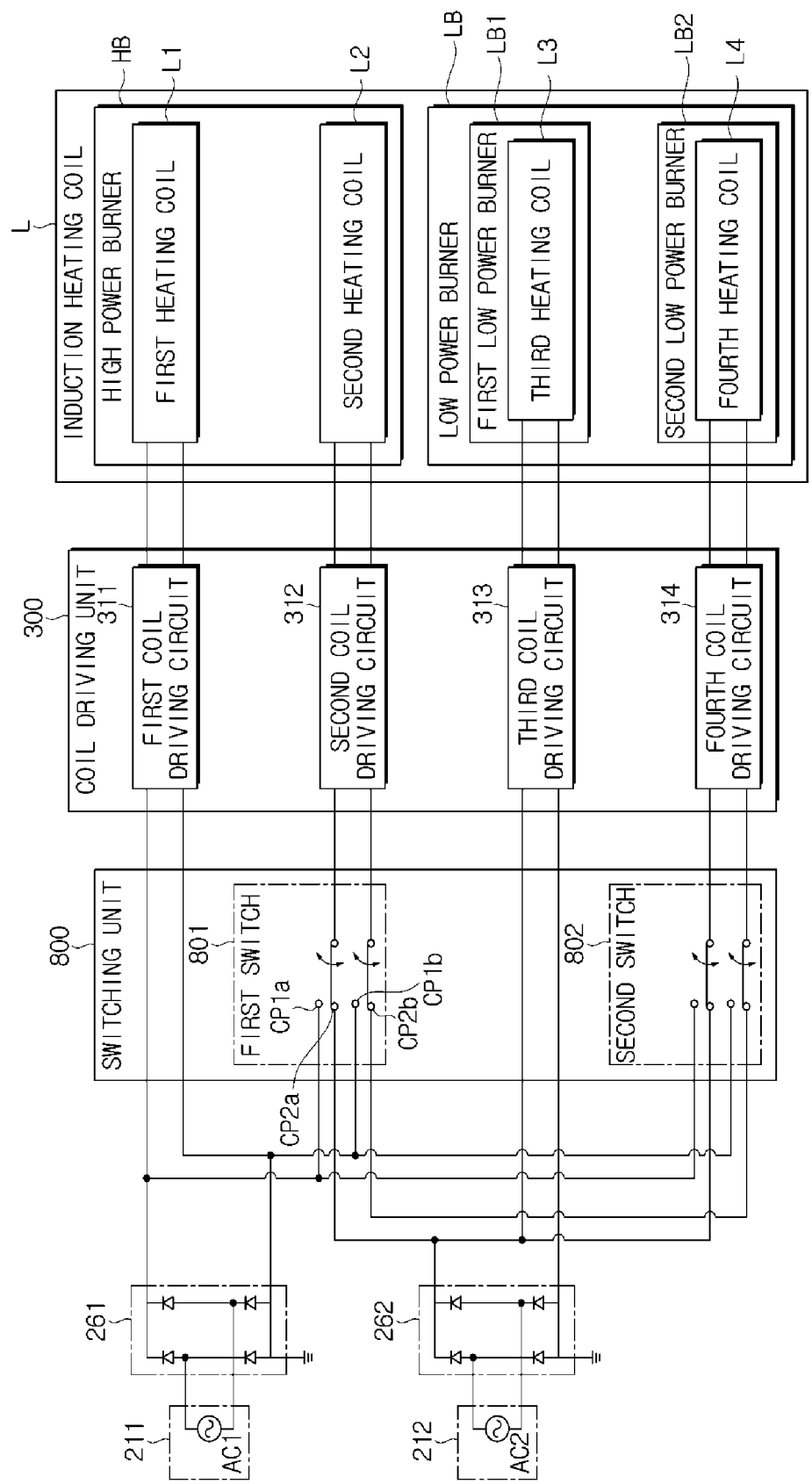
FIG. 15A is an example of a circuit diagram illustrating a cooking apparatus in accordance with at least one exemplary embodiment.
Figure 15B:
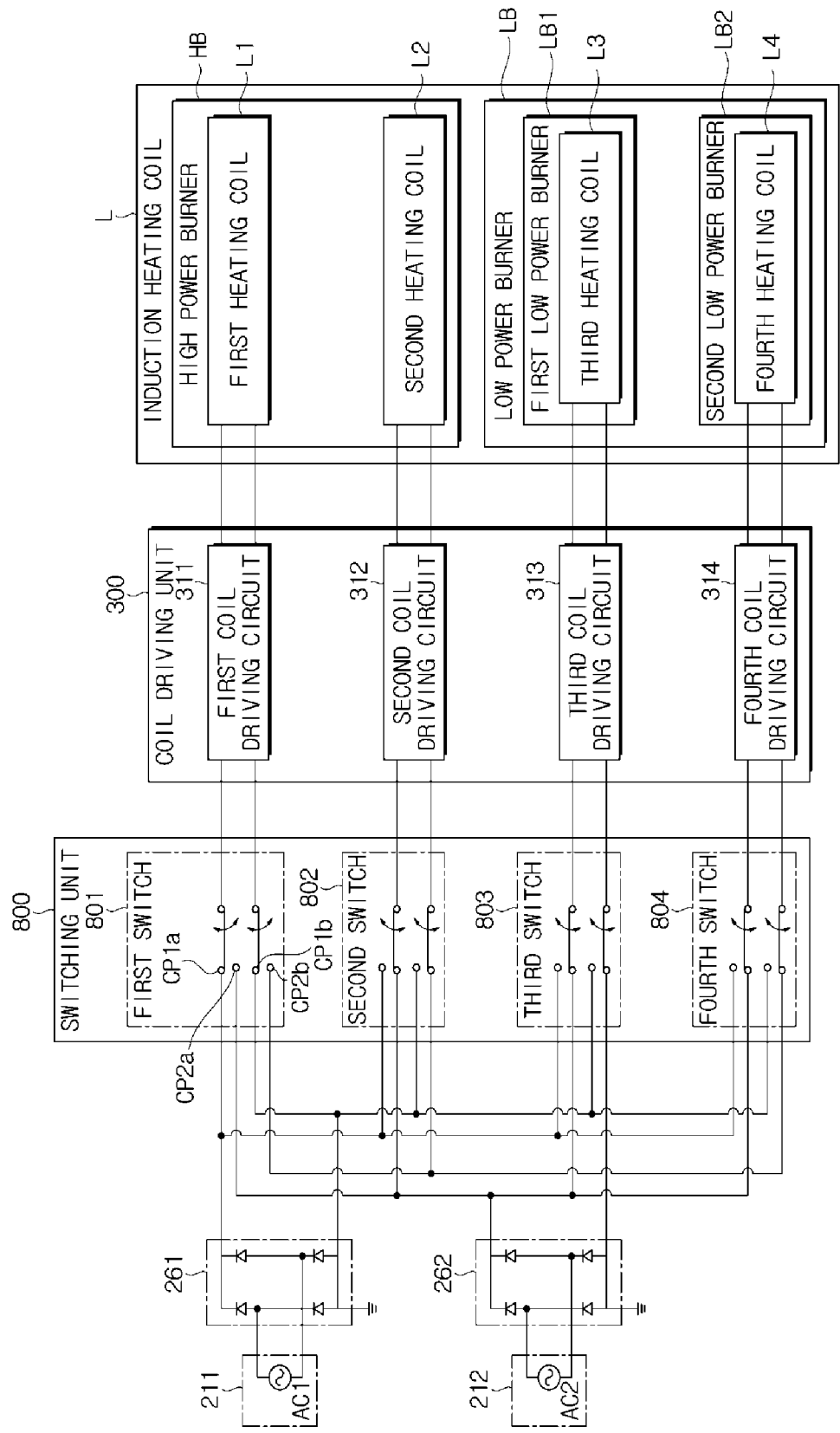
FIG. 15B is another example of a circuit diagram illustrating a cooking apparatus in accordance with at least one exemplary embodiment.

FIG. 14 is a block diagram illustrating a cooking apparatus in accordance with least one exemplary embodiment, FIG. 15A is an example of a circuit diagram illustrating a cooking apparatus in accordance with at least one exemplary embodiment, and FIG. 15B is another example of a circuit diagram illustrating a cooking apparatus in accordance with least one exemplary embodiment.

As illustrated in FIG. 14, induction heating coils L may include a high power burner HB having a high output and a low power burner LB having a low output. The high power burner HB may include a first heating coil L1 and a second heating coil L2, and may be provided to have an output approximately twice that of the low power burner LB having one heating coil. The low power burner LB may include a first low power burner LB1 having a third heating coil L3 and a second low power burner LB2 having a fourth heating coil L4.

The power supply unit 200 may include the AC power supply unit 210 that generates an AC power supply and the rectifying unit 260 that rectifies and smooths the AC power supply generated by the AC power supply unit 210. The first AC power supply unit 211 transmits the generated AC power supply to the first rectifying unit 261, and the first rectifying unit 261 converts the AC power supply into a DC power supply and transmits the converted DC power supply to the first coil driving circuit 311. The second AC power supply unit 212 transmits the generated AC power supply to the second rectifying unit 262, and the second rectifying unit 262 converts the AC power supply into a DC power supply, distributes the converted DC power supply in parallel, and then transmits the distributed DC power supply to the second coil driving circuit 312 to the fourth coil driving circuit 314. In other words, the DC power supply of the second rectifying unit 262 may be shared.

The DC power supply converted through the second rectifying unit 262 may be divided into three branches, introduced into the second coil driving circuit 312 to the fourth coil driving circuit 314, and converted into driving power supplies of the second heating coil L2 to the fourth heating coil L4 to be supplied. However, since a maximum current of rated power and maximum power, which can be supplied from a single AC power supply unit 210, have limitations, power of another AC power supply unit 210 is required to be used so that two heating coils among the second heating coil L2 to the fourth heating coil L4 consume maximum power.

For example, the output level of the heating coil may be set to be 11 levels from a level 0 to a level 10, the output level of the first heating coil L1 may be set to be the level 10 through the user interface 120, and a sum of the output levels set in the second heating coil L2 to the fourth heating coil L4 may be set to be 10 or less. A difference in currents between the respective levels may be defined as 1.6 A. In other words, when the output level is the level 10, a current applied to the heating coil may be 16 A. The first heating coil L1 can be operated with power of only the first AC power supply unit 211, and the second heating coil L2 to the fourth heating coil L4 can be operated with the power of only the second AC power supply unit 212.

However, the operations of the second heating coil L2 to the fourth heating coil L4 which have been commanded through the user interface 120 may exceed the maximum power of the second AC power supply unit 212. In other words, a sum of the output levels set in the second heating coil L2 to the fourth heating coil L4 may exceed 10. The second heating coil L2 to the fourth heating coil L4 may not be operated with only the maximum power of the second AC power supply unit 212. For example, when the output level set in the first heating coil L1 is 5, the output level set in the second heating coil L2 is 5, the output level set in the third heating coil L3 is 5, and the output level set in the fourth heating coil L4 is 5, the second heating coil L2 to the fourth heating coil L4 may not properly receive the output according to a user's command input to the user interface 120, only with the power of the second AC power supply unit 212. Thus, the control unit 100 may control the switching unit 800 so that the DC power supply generated by passing through the first rectifying unit 261 may be supplied to one coil driving circuit (e.g., the fourth coil driving circuit 314) among the second coil driving circuit 312 to the fourth coil driving circuit 314. That is, the power of the first AC power supply unit 211 may be provided to the first heating coil L1 and the heating coil (e.g., the fourth heating coil L4) which is selected, and the power of the second AC power supply unit 212 may be provided to the other two heating coils (e.g., the second heating coil L2 and the third heating coil L3) which are not selected.

The switching unit 800 may be a circuit that can arbitrarily select a plurality of output terminals according to the control signal of the control unit 100A multiplexer (MUX) may be used a switching unit 800.

The switching unit 800 may be provided in input terminals of some of the plurality of coil driving circuits. For example, the switching unit 800 may include a first switch 801 formed in the input terminal of the second coil driving circuit 312 and a second switch 802 formed in the input terminal of the fourth coil driving circuit 314.

The first switch 801 may be connected to second contact points cp2*a* and cp2*b* connected to the second rectifying unit 262, and switched into first contact points cp1*a* and cp1*b* connected to the first rectifying unit 261 when a switching signal is input. The second switch 802 may be connected to the second contact points cp2*a* and cp2*b* connected to the second rectifying unit 262, and switched into the first contact points cp1*a* and cp1*b* connected to the first rectifying unit 261 when a switching signal is input, in the same manner as in the first switch 801.

The switching unit 800 may be provided in all input terminals of the plurality of coil driving circuits. For example, as illustrated in FIG. 15B, the switching unit 800 may include the first switch 801 provided in the input terminal of the first coil driving circuit 311, the second switch 802 provided in the input terminal of the second coil driving circuit 312, a third switch 803 provided in the input terminal of the third coil driving circuit 313, and a fourth switch 804 provided in the input terminal of the fourth coil driving circuit 314.

The first switch 801 may be connected to the first contact points cp1*a* and cp1*b* connected to the first rectifying unit 261, and switched into the second contact points cp2*a* and cp2*b* connected to the second rectifying unit 262 when a switching signal is input. The second switch 802 may be connected to the second contact points cp2*a* and cp2*b* connected to the second rectifying unit 262, and switched into the first contact points cp1*a* and cp1*b* connected to the first rectifying unit 261 when a switching signal is input. The third switch 803 may be connected to the second contact points cp2*a* and cp2*b* connected to the second rectifying unit 262, and switched into the first contact points cp1*a* and cp1*b* connected to the first rectifying unit 261 when a switching signal is input, in the same manner as in the second switch 802. The fourth switch 804 may be connected to the second contact points cp2*a* and cp2*b* connected to the second rectifying unit 262, and switched into the first contact points cp1*a* and cp1*b* connected to the first rectifying unit 261 when a switching signal is input, in the same manner as in the second switch 802. The switching unit 800 may switch both an input voltage node and a ground node, which are introduced into a single coil driving circuit. For example, the first switch 801 of FIG. 15A may be connected to the second contact point cp2*a* of the input voltage node and the second contact point cp2*b* of the ground node, and switched into the first contact point cp1*a* of the input voltage node and the first contact point cp1*b* of the ground node when a switching signal is input.

The switching unit 800 may be a contact point type switch, a variable resistance switch that changes resistance, or a switch that uses a semiconductor device such as a thyristor. Various types of switches which can be considered by a designer may be adopted as an example of the switching unit 800.

The switching unit 800 may switch and output power supplies of two different phases, and adjust power of the power supply that is output at a preset ratio between output terminals from which a power supply of the same phase is output.

Figure 16:
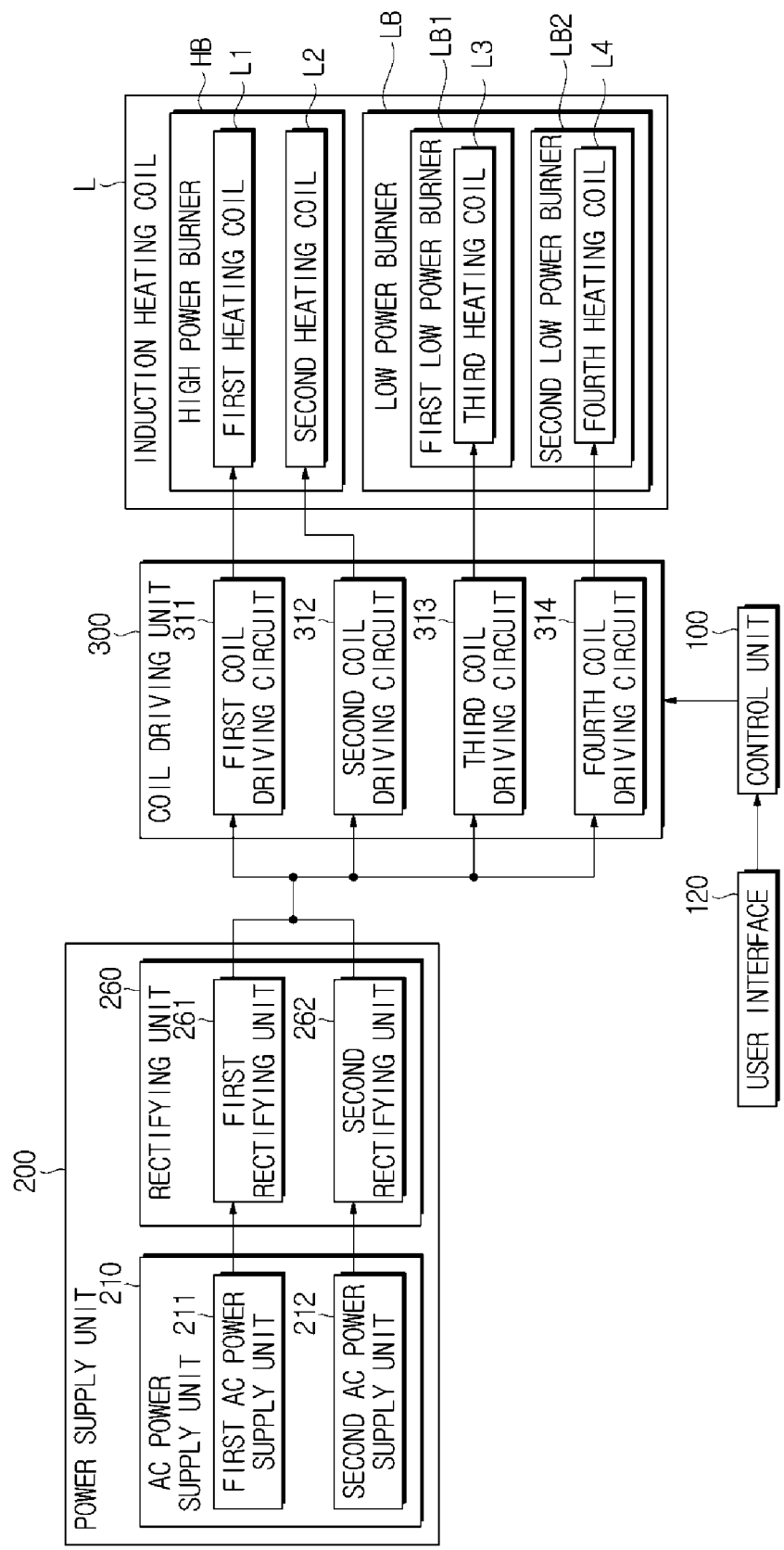
FIG. 16 is a block diagram illustrating a cooking apparatus in accordance with at least one exemplary embodiment.
Figure 17:
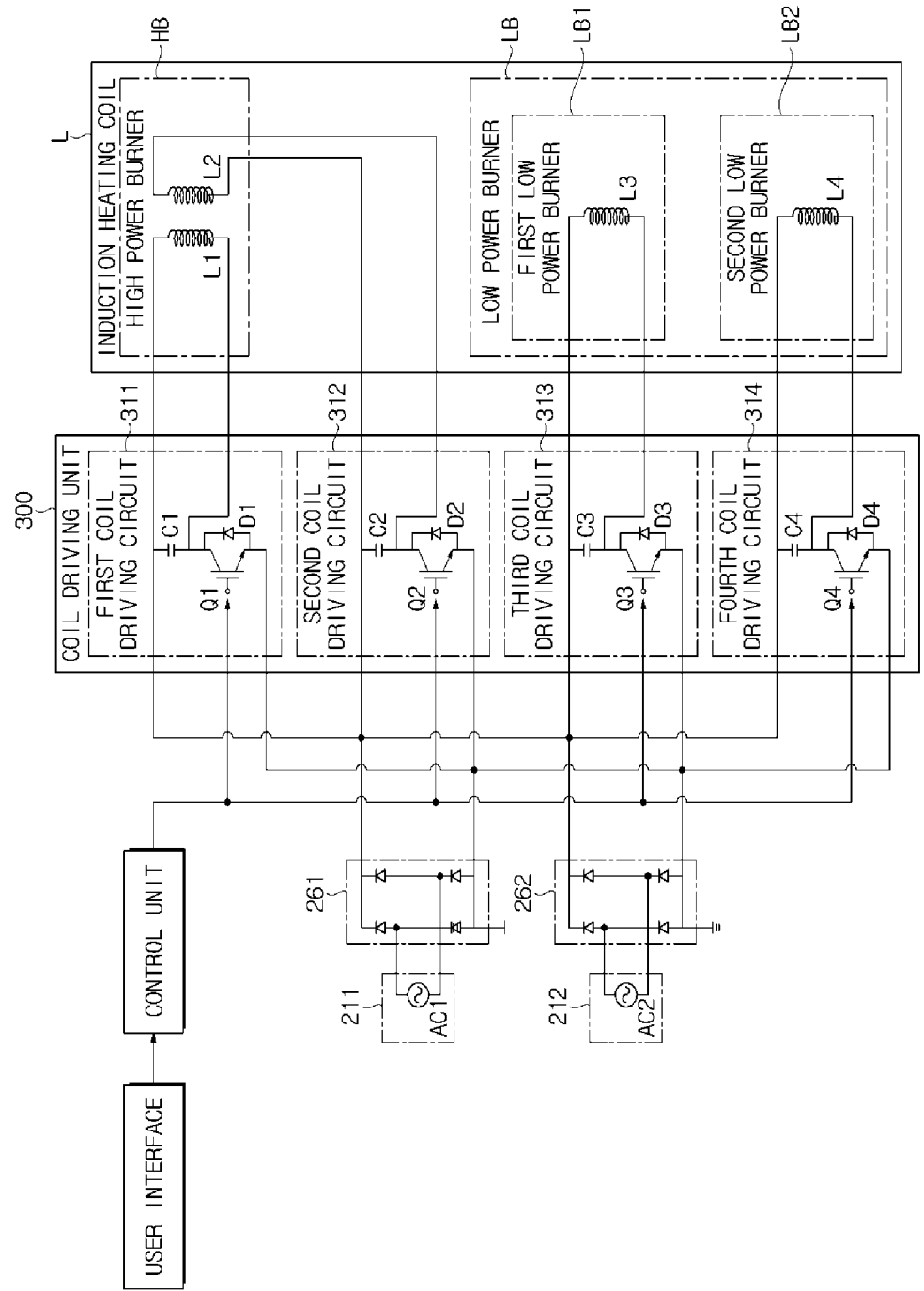
FIG. 17 is an example of a circuit diagram illustrating a cooking apparatus in accordance with at least one exemplary embodiment.

FIG. 16 is a block diagram illustrating a cooking apparatus in accordance with at least one exemplary embodiment, and FIG. 17 is an example of a circuit diagram illustrating a cooking apparatus in accordance at least one exemplary embodiment.

An embodiment which has been described with reference to FIG. 14 to FIG. 15B that includes the switching unit 800, but in at least one embodiment, the coil driving unit 300 acts as the switching unit 800.

As illustrated in FIGS. 16 and 17, the coil driving circuit may include a switch, and the switch may be connected to the first AC power supply unit 211 or the second AC power supply unit 212 according to a control signal of the control unit 100. An output node of the first rectifying unit 261 and an output node of the second rectifying unit 262 may be connected to each other so as to share the voltage node and the ground node. The control unit 100 may control whether a corresponding inverter generates a driving power supply of a target frequency by transmitting the control signal to a gate terminal of the inverter. Through this, the control unit 100 may selectively supply the driving power supply supplied to the induction heating coils L by controlling the coil driving circuit.

For example, when the output level set in the first heating coil L1 is 5, the output level set in the second heating coil L2 is 5, the output level set in the third heating coil L3 is 5, and the output level set in the fourth heating coil L4 is 5, the second heating coil L2 to the fourth heating coil L4 may not receive an output according to a user's command input to the user interface 120, only with the power of the second AC power supply unit 212. Thus, the control unit 100 may control the coil driving unit 300 so that the first coil driving circuit 311 and the second coil driving circuit 312 may be controlled to be connected to the first AC power supply unit 211 and the third coil driving circuit 313 and the fourth coil driving circuit 314 may be controlled to be connected to the second AC power supply unit 212.

Figure 18:
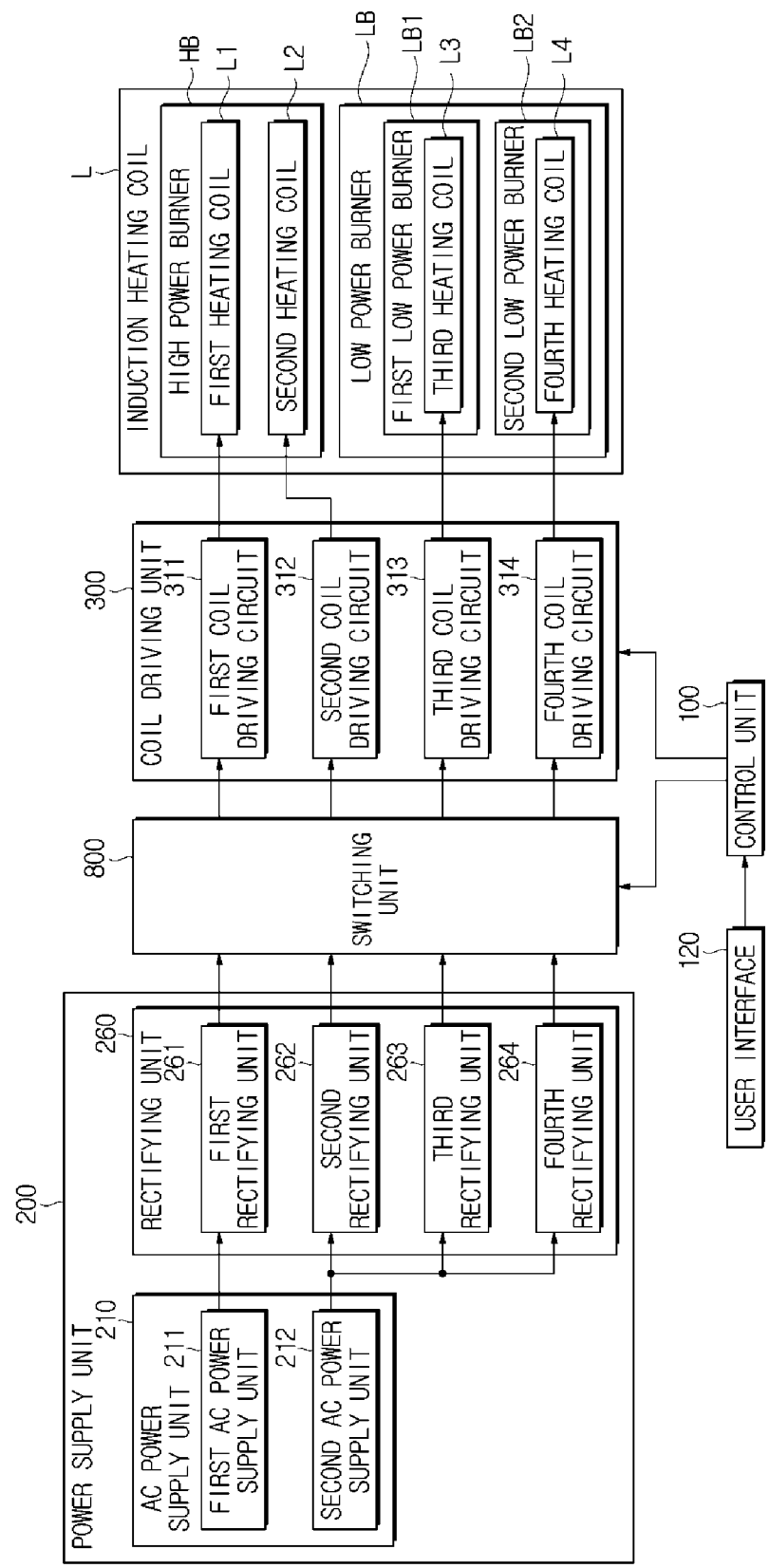
FIG. 18 is a block diagram illustrating a cooking apparatus in accordance with a at least one exemplary embodiment.

FIG. 18 is a block diagram illustrating a cooking apparatus in accordance with least one exemplary embodiment.

In the embodiment described with reference to FIG. 14, a DC power supply of the power supply unit 200 may be shared, but in at least one embodiment, an AC power supply may be shared.

As illustrated in FIG. 18, the rectifying unit 260 included in the power supply unit 200 may include the first rectifying unit 261, the second rectifying unit 262, the third rectifying unit 263, and the fourth rectifying unit 264. An AC power supply generated by the first AC power supply unit 211 is introduced into the first rectifying unit 261 in the same manner as that in the first embodiment. However, the AC power supply generated by the second AC power supply unit 212 is divided into three branches and introduced into the second rectifying unit 262 to the fourth rectifying unit 264.

Figure 19:
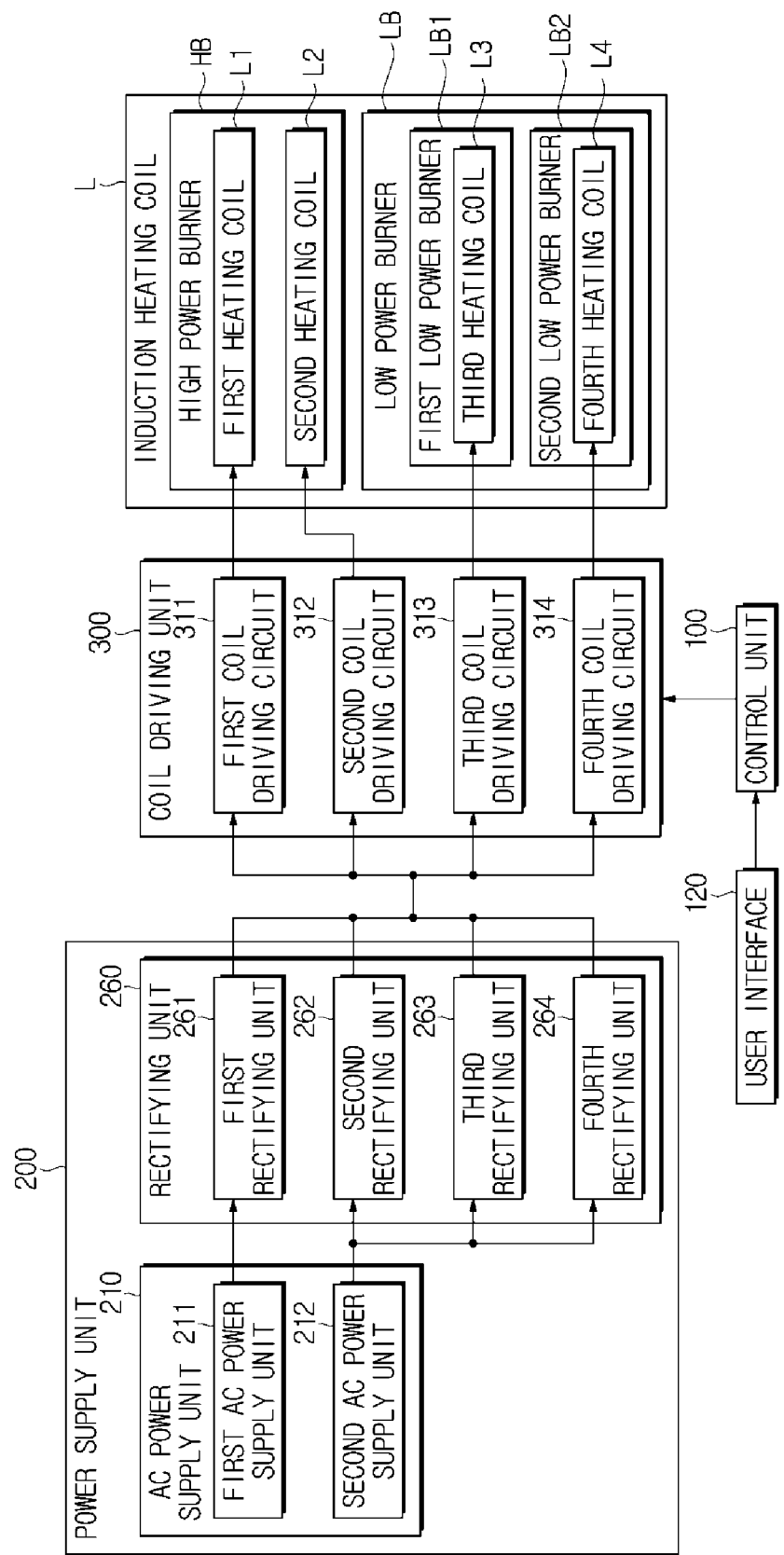
FIG. 19 is a block diagram illustrating a cooking apparatus in accordance with of the at least one exemplary embodiment.

FIG. 19 is a block diagram illustrating a cooking apparatus in accordance with an eighth embodiment of the at least one exemplary embodiment.

The embodiment which has been described with reference to FIG. 18 includes the switching unit 800, but in at least one embodiment, the coil driving unit 300 acts as the switching unit 800.

As illustrated in FIG. 19, the coil driving circuit may include a switch, and the switch may be connected to the first AC power supply unit 211 or the second AC power supply unit 212 according to a control signal of the control unit 100.

For example, when the output level set in the first heating coil L1 is 5, the output level set in the second heating coil L2 is 5, the output level set in the third heating coil L3 is 5, and the output level set in the fourth heating coil L4 is 5, the second heating coil L2 to the fourth heating coil L4 may not receive an output according to a user's command input to the user interface 120, only with the power of the second AC power supply unit 212. Thus, the control unit 100 may control the coil driving unit 300 so that the first coil driving circuit 311 and the second coil driving circuit 312 may be controlled to be connected to the first AC power supply unit 211 and the third coil driving circuit 313 and the fourth coil driving circuit 314 may be controlled to be connected to the second AC power supply unit 212.

Figure 20A:
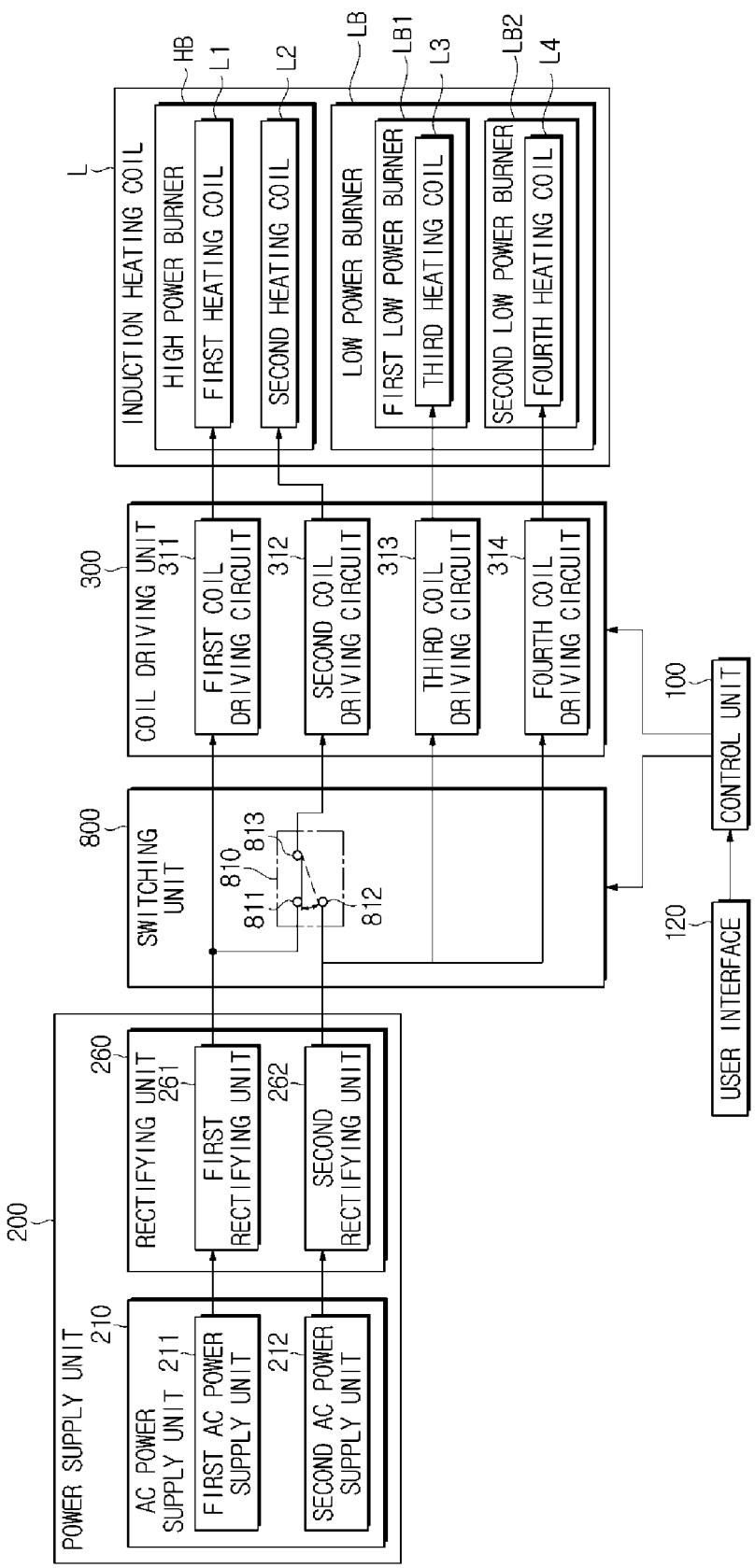
FIG. 20A is a block diagram illustrating a cooking apparatus in accordance with at least one exemplary embodiment.

FIG. 20A is a block diagram illustrating a cooking apparatus in accordance with least one exemplary embodiment.

As illustrated in FIG. 20A, the first AC power supply unit 211 and the second AC power supply unit 212 of the power supply unit 200 may be respectively connected to the switching unit 800 through the first rectifying unit 261 and the second rectifying unit 262 of the rectifying unit 260.

The switching unit 800 may be connected to the second coil driving circuit 312 of the coil driving unit 300, and include a first switch 810 that selectively transmits any one of currents transmitted from the first AC power supply unit 211 and the second AC power supply unit 212, to the second coil driving circuit 312.

The first switch 810 may include a plurality of terminals 811, 812, and 813, and the first terminal 811 may be electrically connected to the first rectifying unit 261 and the second terminal 812 may be electrically connected to the second rectifying unit 262. The third terminal 813 may be electrically connected to the second coil driving circuit 312. The first switch 810 may selectively connect the first terminal 811 and the third terminal 813, or connect the second terminal 812 and the third terminal 813, so that the second coil driving circuit 312 may be selectively connected to any one of the first rectifying unit 261 and the second rectifying unit 262. Thus, the current output from the first AC power supply unit 211 or the current output from the second AC power supply unit 212 may be selectively supplied to the second coil driving circuit 312.

As illustrated in FIG. 20A, the first rectifying unit 261 may be electrically connected even to the first coil driving circuit 311 of the coil driving unit 300 as well as the first switch 810. The AC power supply generated in the first rectifying unit 261 may be divided into two branches within the switching unit 800, and one branch is connected to the first coil driving circuit 311 and the other branch is connected to the first switch 810. Thus, the current supplied from the first rectifying unit 261 may be selectively supplied to the second coil driving circuit 312 according to the operation of the first switch 810 while being supplied to the first coil driving circuit 311.

The second rectifying unit 262 may be electrically connected to the third coil driving circuit 313 and the fourth coil driving circuit 314 of the coil driving unit 300 and the first switch 810. In other words, the AC power supply generated in the second rectifying unit 262 may be divided into three branches within the switching unit 800, one branch may be connected to the first switch 810, another branch may be connected to the third coil driving circuit 313, and an branch is connected to the fourth coil driving circuit 314. Thus, the current supplied from the second rectifying unit 262 may be selectively supplied to the second coil driving circuit 312 while being supplied to the third coil driving circuit 313 and the fourth coil driving circuit 314.

The current transmitted to the second coil driving circuit 312 may be applied to the second heating coil L2, and therefore the second heating coil L2 may be heated by the current transmitted from the first AC power supply unit 211 or the second AC power supply unit 212 according to the operation of the first switch 810. The operation of the first switch 810 may be performed based on the output level of the heating coil as described above.

Figure 20B:
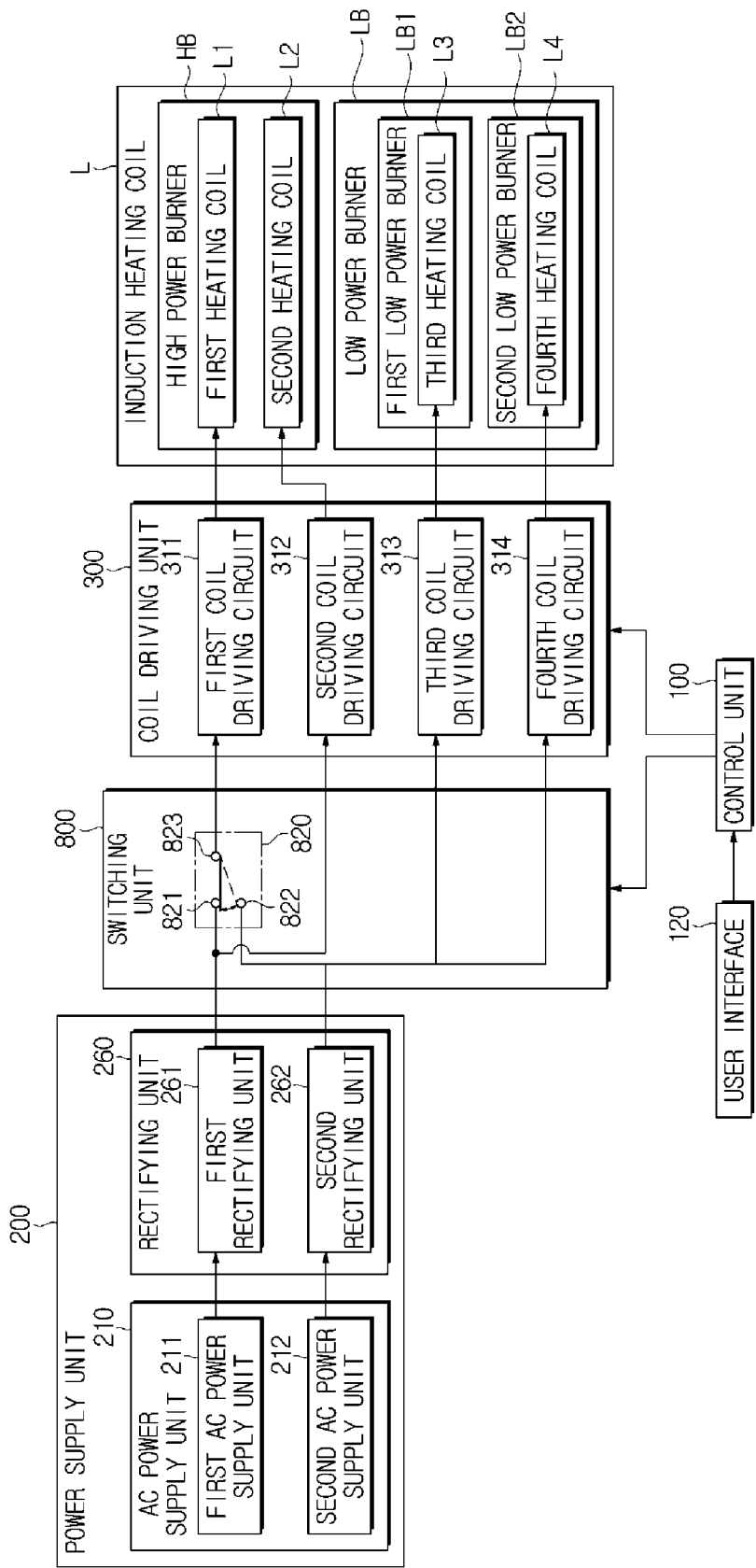
FIG. 20B is a block diagram illustrating a cooking apparatus in accordance with at least one exemplary embodiment.

FIG. 20B is a block diagram illustrating a cooking apparatus in accordance with at least one exemplary embodiment.

As illustrated in FIG. 20B, the first AC power supply unit 211 and the second AC power supply unit 212 of the power supply unit 200 may be provided to be connected to the switching unit 800 through the first rectifying unit 261 and the second rectifying unit 262 of the rectifying unit 260.

The switching unit 800 may be connected to the first coil driving circuit 311 of the coil driving unit 300, and selectively transmit any one of the currents transmitted from the first AC power supply unit 211 and the second AC power supply unit 212, to the first coil driving circuit 311. The switching unit 800 may include a second switch 820.

The second switch 820 may include a plurality of terminals 821, 822, and 823. The first terminal 821 of the second switch 820 is electrically connected to the first rectifying unit 261, the second terminal 822 of the second switch 820 is electrically connected to the second rectifying unit 262, and the third terminal 823 of the second switch 820 is electrically connected to the first coil driving circuit 311. The second switch 820 may selectively connect the first terminal 821 and the third terminal 823 or connect the second terminal 822 and the third terminal 823, so that the first coil driving circuit 311 may be selectively connected to any one of the first rectifying unit 261 and the second rectifying unit 262. The current output from the first AC power supply unit 211 or the current output from the second AC power supply unit 212 may be selectively supplied to the first coil driving circuit 311.

As illustrated in FIG. 20B, the first rectifying unit 261 may be electrically connected even to the second coil driving circuit 312 of the coil driving unit 300 as well as the second switch 820. In other words, the AC power supply generated in the first rectifying unit 261 may be divided into two branches within the switching unit 800, one branch may be connected to the second switch 820, and the other branch may be connected to the second coil driving circuit 312. Thus, the current supplied from the first rectifying unit 261 may be selectively supplied to the first coil driving circuit 311 according to the operation of the second switch 820 while being further supplied to the second coil driving circuit 312.

The second rectifying unit 262 may be electrically connected even to the third coil driving circuit 313 and the fourth coil driving circuit 314 of the coil driving unit 300 as well as the second switch 820. The AC power supply generated in the second rectifying unit 262 is divided into three branches within the switching unit 800, one branch is connected to the second switch 820, another branch is connected to the third coil driving circuit 313, and an branch is connected to the fourth coil driving circuit 314. Thus, the current supplied from the second rectifying unit 262 may be further selectively supplied to the first coil driving circuit 311 while being supplied to the third coil driving circuit 313 and the fourth coil driving circuit 314.

The first heating coil L1 receives the current applied to the first coil driving circuit 311, and therefore the first heating coil L1 is heated by the current transmitted from the first AC power supply unit 211 according to the operation of the second switch 820, or heated by the current transmitted from the second AC power supply unit 212. The operation of the second switch 820 may be performed based on the output level of the heating coil as described above.

Hereinafter, various examples of the switching unit which are provided as an independent module from a main printed circuit board (PCB) will be described with reference to FIGS. 21A to 25B.

Figure 21A:
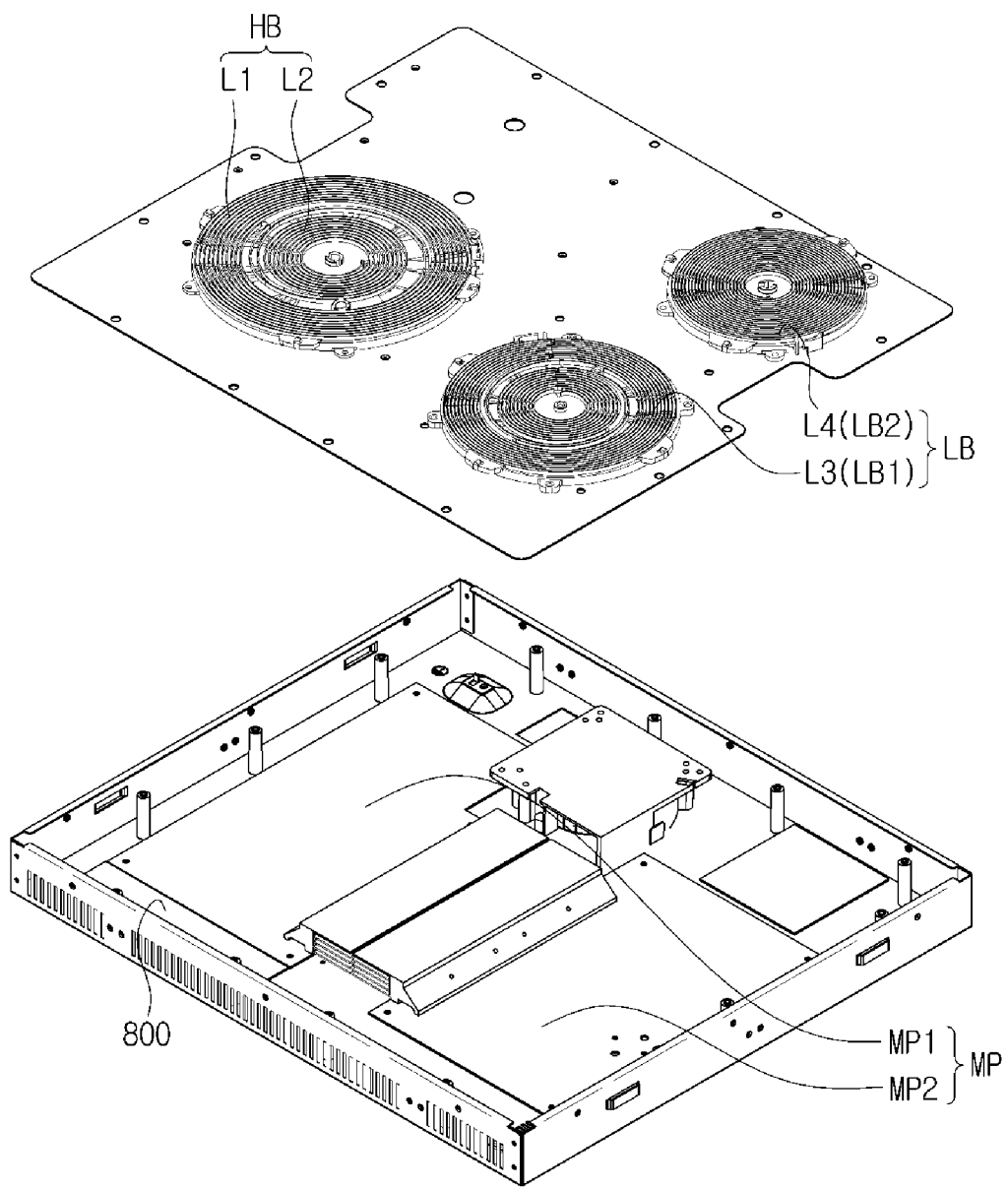
FIG. 21A is an exploded view illustrating one side surface of a cooking apparatus in accordance with at least one exemplary embodiment.
Figure 21B:
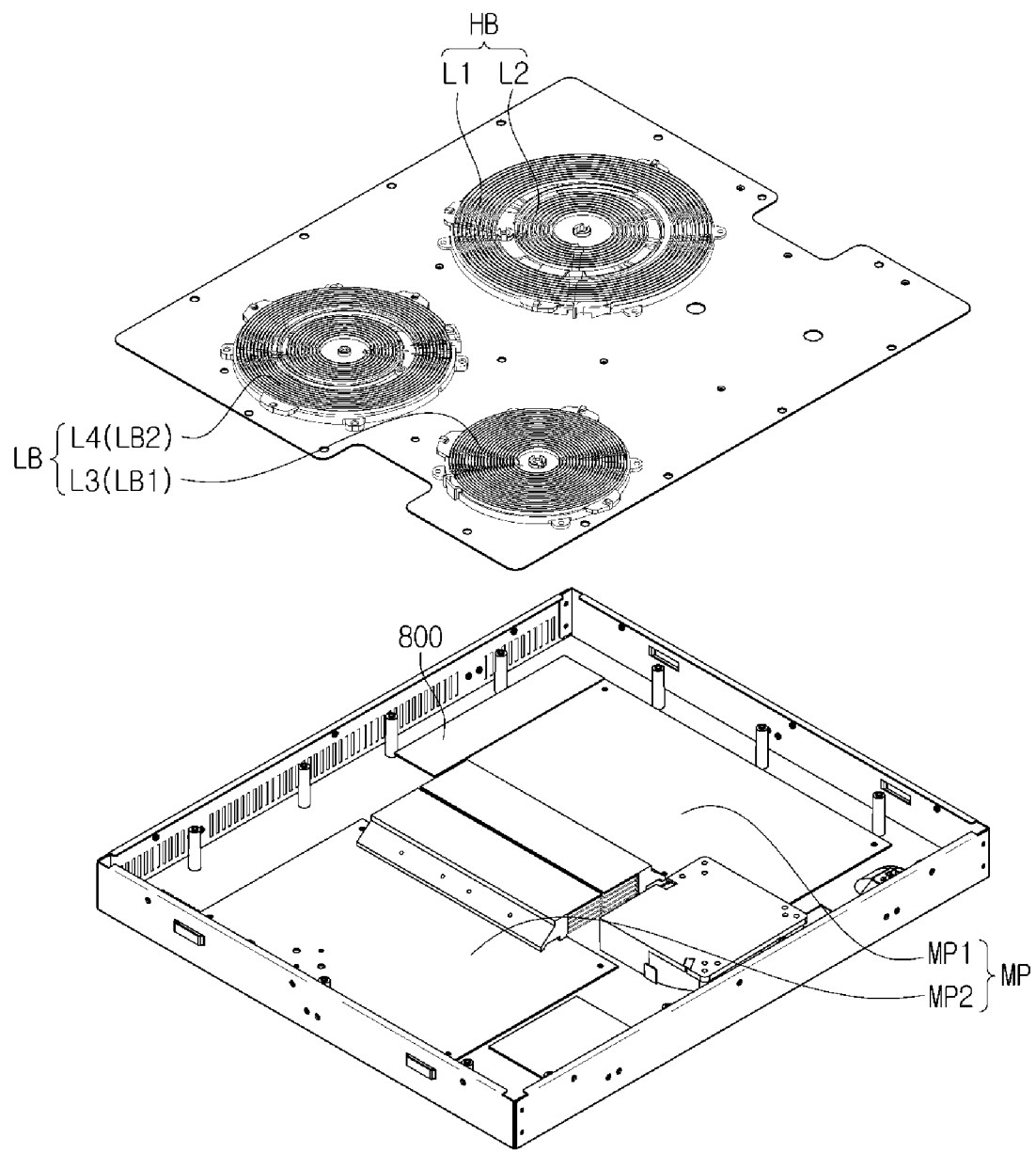
FIG. 21B is an exploded view illustrating one side surface of a cooking apparatus in accordance with at least one exemplary embodiment.

FIG. 21A is an exploded view illustrating one side surface of a cooking apparatus in accordance with at least one exemplary embodiment, and FIG. 21B is an exploded view illustrating one side surface of a cooking apparatus in accordance with at least one exemplary embodiment.

As illustrated in FIGS. 21A and 21B, a plurality of heating coils, for example, a first heating coil L1, a second heating coil L2, a third heating coil L3, and a fourth heating coil L4 may be provided below the cooking plate 11 of the cooking apparatus 1. The plurality of heating coils L1, L2, L3, and L4 may be combined so that a high power burner HB and a low power burner LB are provided. The high power burner HB may include the first heating coil L1 on the inner side thereof and the second heating coil L2 on the outer side thereof, e.g., the first heating coil L1 and the second heating coil L2 are concentric. The low power burner LB may include a first low power burner LB1 and a second low power burner LB2, and the first low power burner LB1 may include the third heating coil L3, and the second low power burner LB2 may include the fourth heating coil L4.

A component for transmitting a driving power supply to a coil may be positioned below a burner including the coil. For example, below the burner including the coil, a main substrate MP and the switching unit 800 may be provided.

The main substrate MP may include a first main substrate MP1 and a second main substrate MP2. The main substrate MP may be provided on both sides of the main body 10. For example, inside the main body 10, a heat sink to dissipate heat may be provided, for example, at the center portion, a fan may be provided outside of the center portion, an SMPS (switched-mode power supply) may be provided, for example outside of the right side portion, and the switching unit 800 may be provided inside of the left side portion. The first main substrate MP1 may be used to supply and controlling a driving power supply to the first heating coil L1 and the second heating coil L2 of the high power burner HB, and may be provided, for example, at the center of the left side portion outside the switching unit 800. The second main substrate MP2 may be used to supply and controlling a driving power supply to the third heating coil L3 and the fourth heating coil L4 of the low power burner LB, and may be provided, for example, at the center of the right side portion inside the SMPS.

In the main substrate MP, a component that may be required for generating and adjusting the driving power supply supplied to the coils and driving and controlling the heating apparatus may be installed. In the main substrate MP, the power supply unit 200, the control unit 100, the coil driving unit 300, the detection unit 400, the storage unit 450, and the communication unit 500 may be installed.

The switching unit 800 may be provided inside, for example, of the left side of the main body 10, to switch an AC power supply of a different phase, which may be provided by the first main substrate MP1 and the second main substrate MP2, and adjust the power supplied from each coil driving circuit 310.

As illustrated in FIGS. 21A and 21B, the main substrate MP and the switching unit 800 may be separately provided as independent modules. However, they may be provided on a single substrate.

An exemplary sequence of the main substrate and the switching unit will be described with reference to FIGS. 22 to 24.

Figure 22:
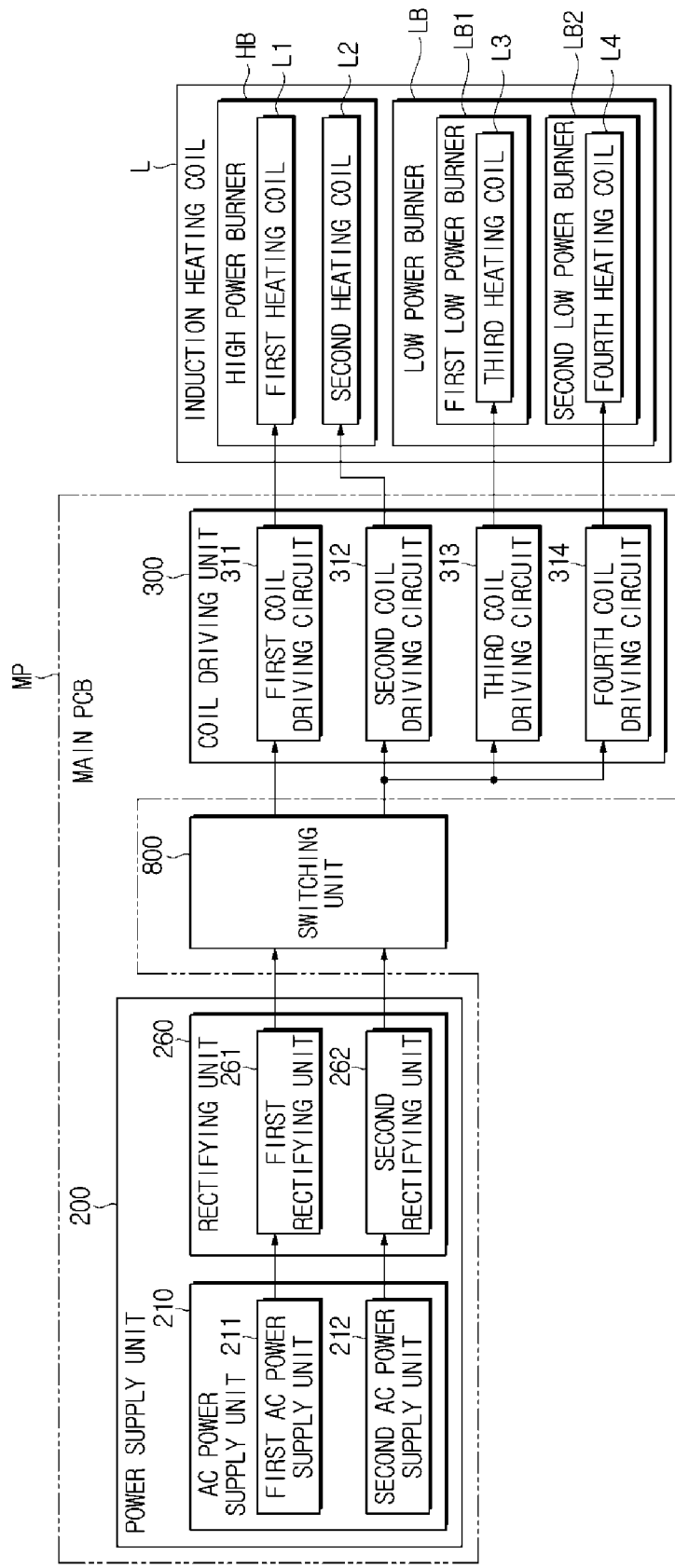
FIG. 22 is a block diagram illustrating a cooking apparatus in accordance with at least one exemplary embodiment.
Figure 23:
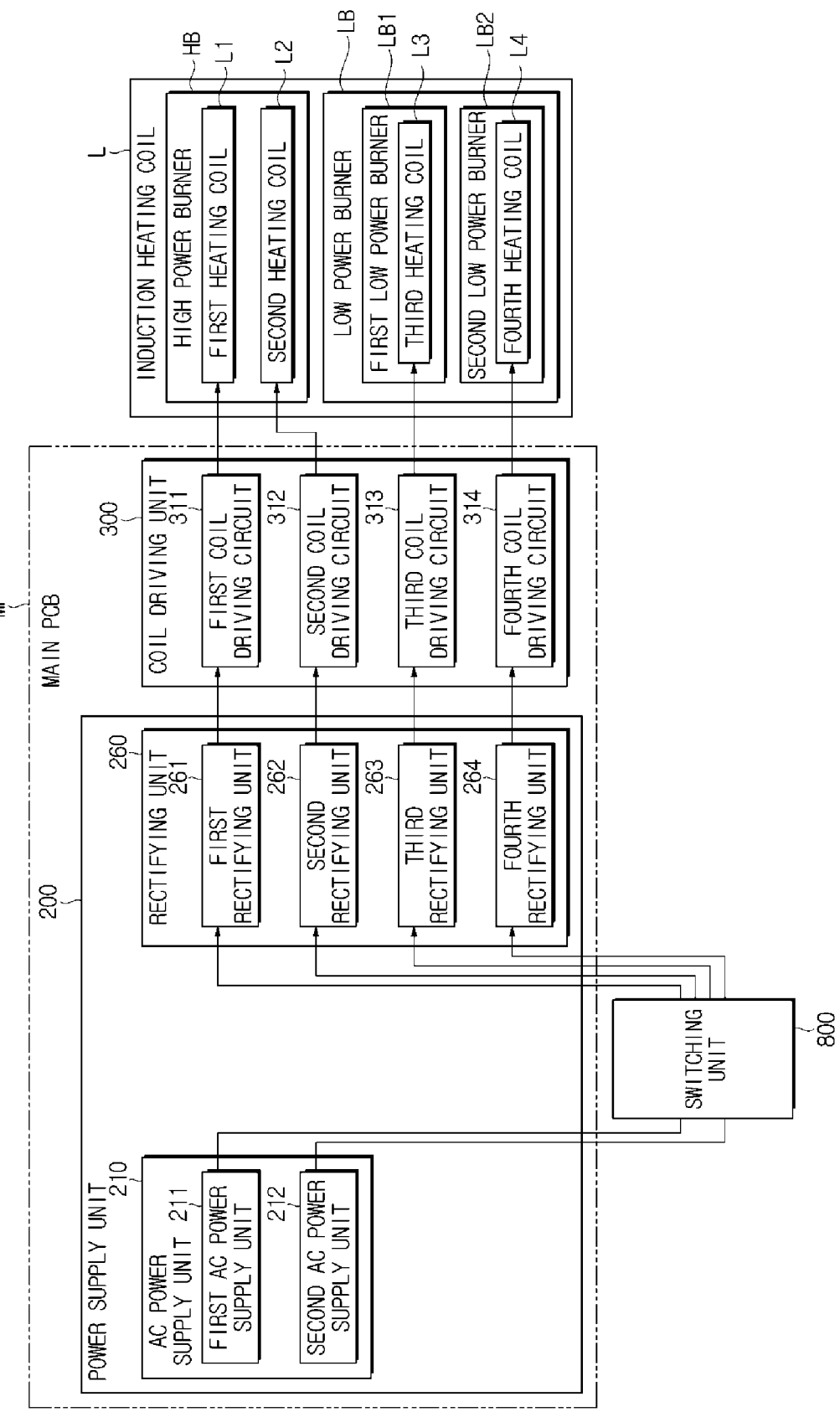
FIG. 23 is a block diagram illustrating a cooking apparatus in accordance with at least one exemplary embodiment.
Figure 24:
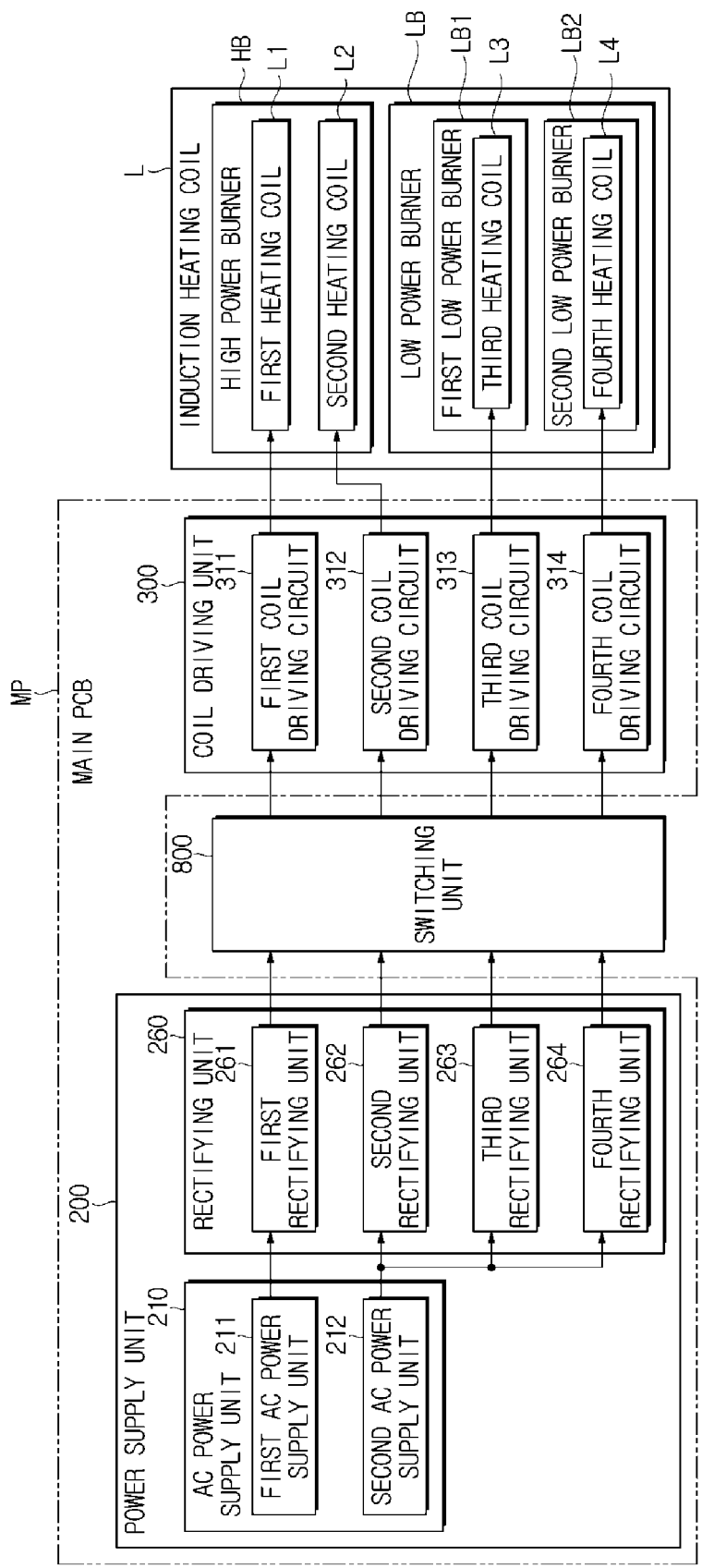
FIG. 24 is a block diagram illustrating a cooking apparatus in accordance with at least one exemplary embodiment.

FIG. 22 is a block diagram illustrating a cooking apparatus in accordance with at least one exemplary embodiment, FIG. 23 is a block diagram illustrating a cooking apparatus in accordance with at least one exemplary embodiment, and FIG. 24 is a block diagram illustrating a cooking apparatus in accordance with at least one exemplary embodiment.

The cooking apparatus 1 may include a main substrate MP, induction heating coils L, and a switching unit 800.

The main substrate MP supplies and adjusts a driving power supply to the heating coils L, and implements the operation of the cooking apparatus 1. The main substrate MP may include a power supply unit 200 and a coil driving unit 300. The power supply unit 200 and the coil driving unit 300 may be the same as or different from the above-described power supply unit 200 and coil driving unit 300.

The induction heating coils L may perform an operation for heating an object to be cooked based on the driving power supply supplied from the main substrate MP. That is, the induction heating coils L may receive the driving power supply generated in the coil driving unit 300 to generate an eddy current in a cooking vessel. The induction heating coils L may be the same as or different from the above-described induction heating coils.

The switching unit 800 may generate a plurality of outputs by using power supply of a plurality of phases as an input, switch the power supply of the plurality of phases into a plurality of output terminals, and divide the power consumption of the plurality of outputs. The function and configuration of the switching unit 800 may be the same as or different from those of the above-described switching unit 800.

The switching unit 800 may be provided as an independent module from the main substrate MP, receive the power supply generated in the main substrate MP, and transmit the switched power supply to the main substrate MP again.

The switching unit 800 may be provided between a rectifying unit and a coil driving unit 300 as illustrated in FIG. 22. That is, the switching unit 800 may switch power supply output from four output terminals by using two DC power supplies of a first rectifying unit 261 and a second rectifying unit 262 of a rectifying unit 260 as inputs, and transmit the switched power supply to the coil driving unit 300.

The switching unit 800 may be provided between an AC power supply unit 210 of the power supply unit 200 and the rectifying unit 260 as illustrated in FIG. 23. That is, the switching unit 800 may switch the power supply output from four output terminals by using two AC power supplies of a first AC power supply unit 211 and a second AC power supply unit 212 of the AC power supply unit 210 as inputs, and transmit the switched power supply to each of the first rectifying unit 261, the second rectifying unit 262, a third rectifying unit 263, and a fourth rectifying unit 264.

The switching unit 800 may be provided between the rectifying unit 260 and the coil driving unit 300 as illustrated in FIG. 24. That is, the switching unit 800 may switch the power supply output from four output terminals by using four DC power supplies of the first rectifying unit 261, the second rectifying unit 262, the third rectifying unit 263, and the fourth rectifying unit 264 of the rectifying unit 260 as inputs, and transmit the switched power supply to the coil driving unit 300.

Figure 25A:
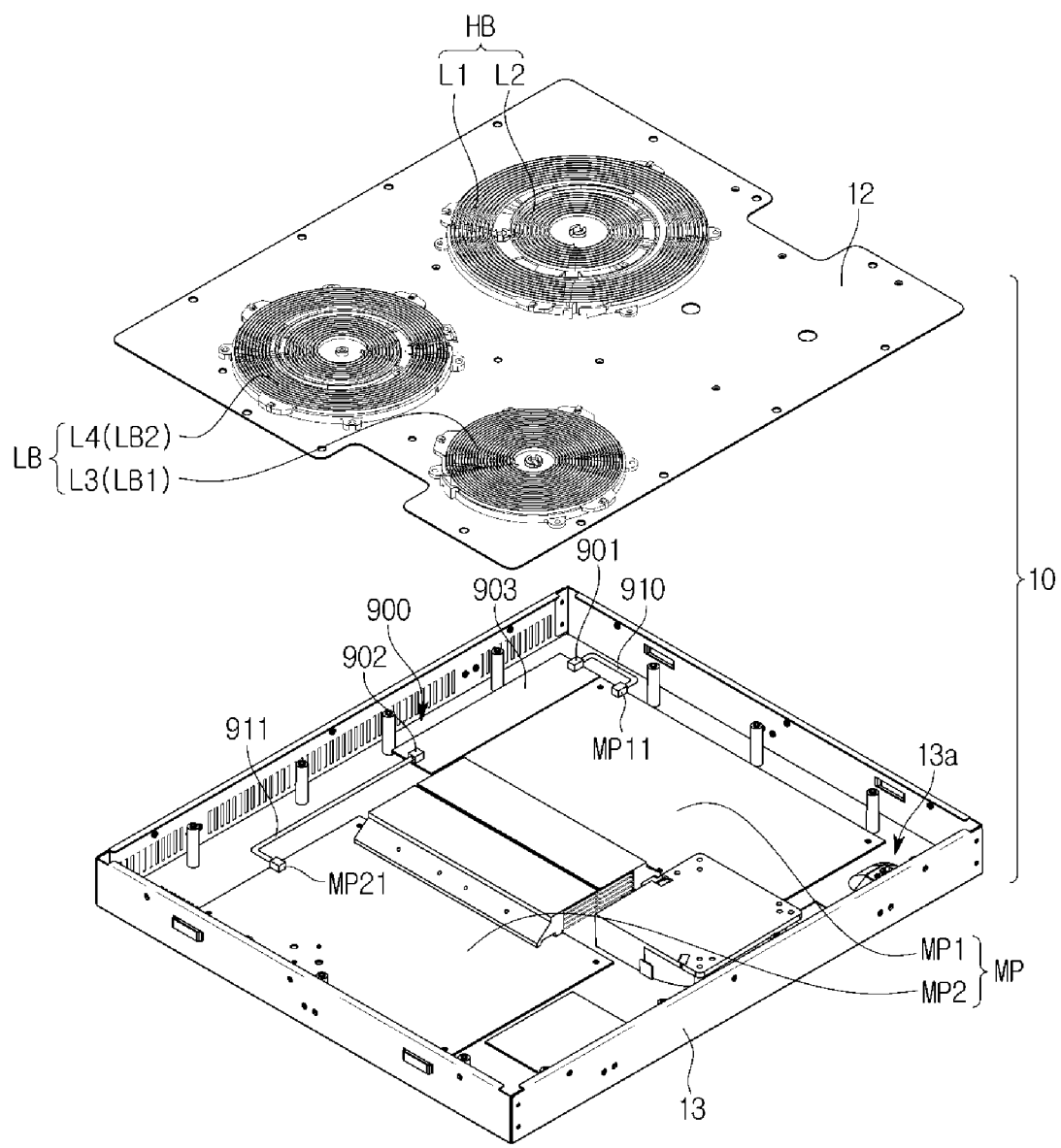
FIG. 25A is an exploded view illustrating one side surface of a cooking apparatus in accordance with at least one exemplary embodiment.
Figure 25B:
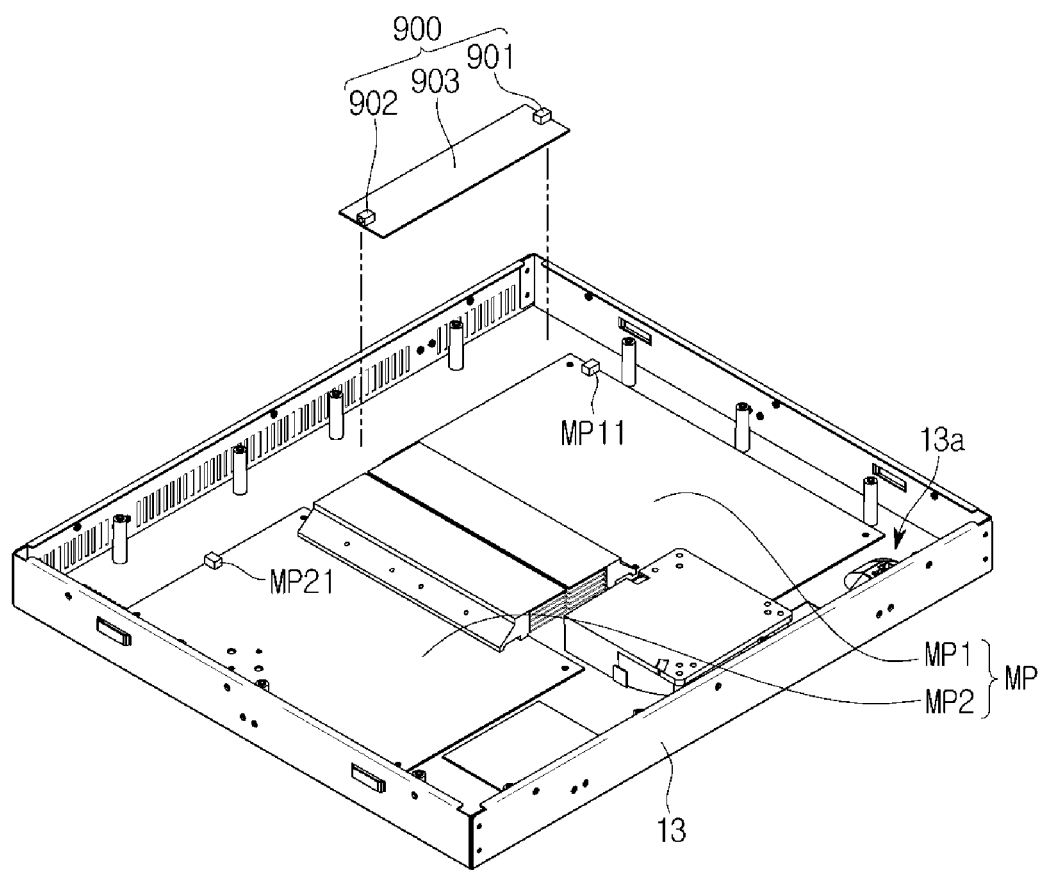
FIG. 25B is an exploded view illustrating one side surface of a cooking apparatus in accordance with at least one exemplary embodiment.
Figure 25C:
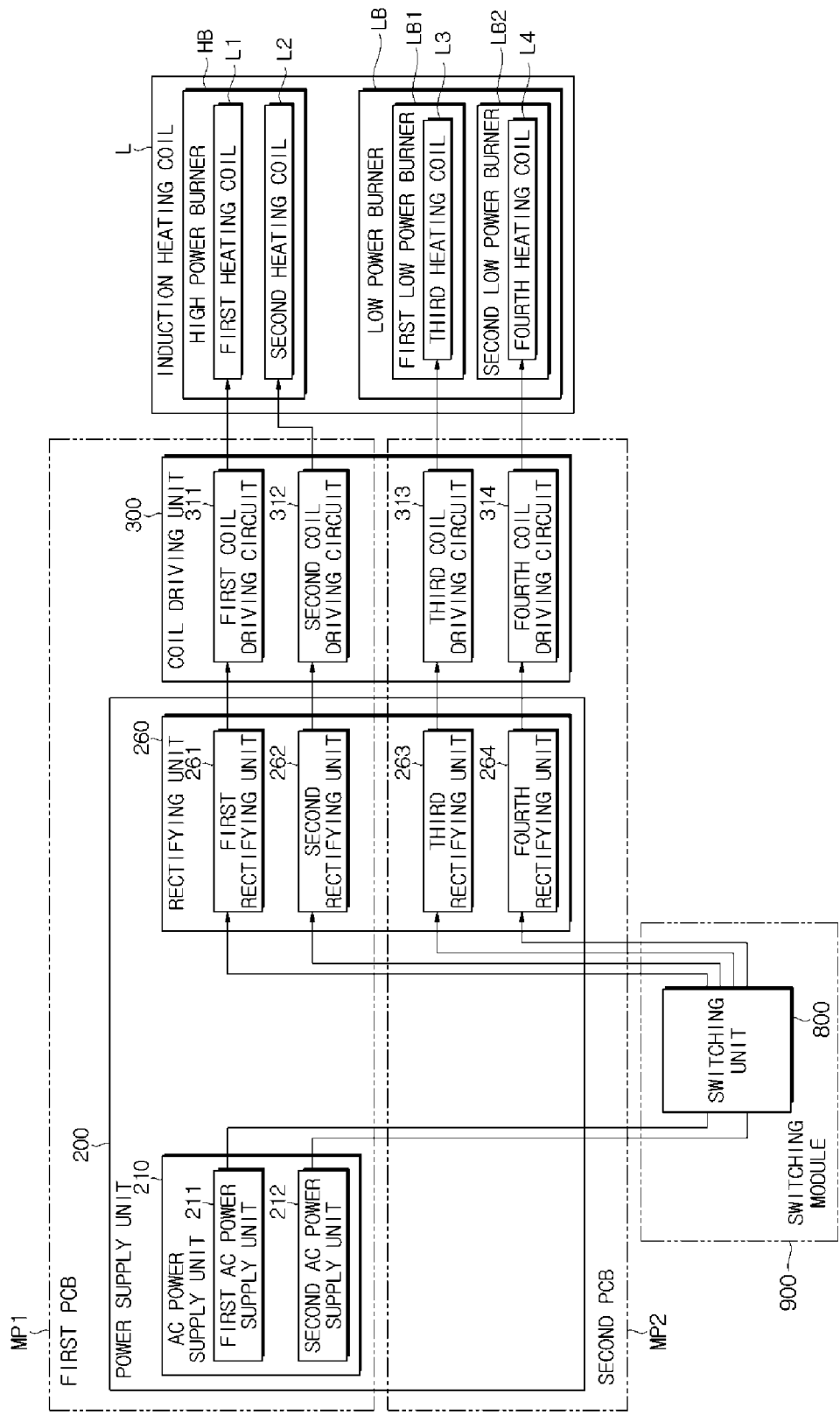
FIG. 25C is a block diagram illustrating a cooking apparatus in accordance with at least one exemplary embodiment.

FIG. 25A is an exploded view illustrating one side surface of a cooking apparatus in accordance with at least one exemplary embodiment, FIG. 25B is an exploded view illustrating one side surface of a cooking apparatus in accordance with at least one exemplary embodiment, and FIG. 25C is a block diagram illustrating a cooking apparatus in accordance with at least one exemplary embodiment.

As illustrated in FIGS. 25A to 25B, the main body 10 of the cooking apparatus 1 may include an upper frame 12 in which a cooking plate 11 having a high power burner HB and a low power burner LB provided therein may be formed and a lower frame 13 that may be coupled to the upper frame 12 and includes various components embedded therein. A plurality of substrates MP1, MP2, and 903) may be provided on one surface 13a inside the lower frame 13, and may be provided to be electrically connected to the high power burner HB and low power burner LB of the upper frame 12 through a circuit or a cable.

As illustrated in FIG. 25C, on a first main substrate MP1, a component to perform the function of a first AC power supply unit 211 of an AC power supply unit 210, a component to perform the function of a first rectifying unit 261 of a rectifying unit 260, a first coil driving circuit 311 of a coil driving unit 300, and various components for assisting operations thereof may be provided. According to at least one exemplary embodiment, a second coil driving circuit 312 may be provided in the first substrate MP1.

In the first substrate MP1, at least one or two first connection port MP11 for allowing the first substrate MP1 to be electrically connected to a third substrate 903 of a switching module 900 may be provided. The at least one or two first connection port MP11 may be installed in a predetermined position of the first substrate MP1 so as to be directly brought into contact with or adjacent to the switching module 900. The first connection port MP11 may be installed in various positions of the first substrate MP1.

The electrical signals output from the first substrate MP1 may be transmitted to the third substrate 903 through the first connection port MP11. The electrical signals transmitted from the third substrate 903 may be transmitted to each component of the first substrate MP1 through the first connection port MP11. When the plurality of connection ports MP11 are installed in the first substrate MP1, any one first connection port MP11 may be provided so as to transmit signals to the third substrate 903, and another first connection port MP11 may be provided so as to receive signals from the third substrate 903.

The first connection port MP11 may be implemented in the form of a connector such as a socket or a plug. A first communication member 910 such as a cable may be coupled to the first connection port MP11. The cable may include a pair cable, a coaxial cable, an Ethernet cable, an optical fiber cable, and the like. The electrical signal output from the first connection port MP11 may be transmitted to the third substrate 903 through the first communication member 910. The electrical signal output from the third substrate 903 may be transmitted to the first connection port MP11 through the first communication member 910, and thereby the transmitted electrical signal may be transmitted to various components provided in the first substrate MP1, for example, a processor.

According to at least one embodiment, the first connection port MP11 may be directly coupled to a third connection port 901 provided in the third substrate 903, and in this case, the first connection port MP11 and the third connection port 901 may have structures corresponding to each other so as to be physically coupled to each other. For example, the first connection port MP11 may be implemented as a socket connector, and the third connection port 901 may be implemented as a plug connector.

According to an embodiment, the electrical signal output from the first rectifying unit 261 provided in the first substrate MP1 may be transmitted to the switching module 900 through the first connection port MP11. The switching module 900 may switch or distribute the transmitted electrical signals, and transmit the switched or distributed electrical signals to any one substrate of the first substrate MP1 and a second main substrate MP2.

As illustrated in FIG. 25C, in the second substrate MP2, a component to perform the function of a second AC power supply unit 212 of the AC power supply unit 210, a component to perform the function of a second rectifying unit 262 of the rectifying unit 260, a third coil driving circuit 313 and a fourth coil driving circuit 314 of the coil driving unit 300, and various components for assisting operations thereof may be provided. According to embodiments, the second coil driving circuit 312 may be further provided in the second substrate MP2.

As illustrated in FIGS. 25A and 25B, in the second substrate MP2, a second connection port MP21 for electrically connecting the third substrate 903 of the switching module 900 and the second substrate MP2 may be provided. The second connection port MP21 may be installed in various positions of the second substrate MP2, and for example, the second connection port MP21 may be installed so as to be directly brought into contact with or adjacent to the switching module 900.

The electrical signal output from the second substrate MP2 may be transmitted to the third substrate 903 through the second connection port MP21, and the electrical signal transmitted from the third substrate 903 may be transmitted to each component of the second substrate MP2 through the second connection port MP21. When a plurality of second connection ports MP21 are installed in the second substrate MP2, any one second connection port MP21 may be provided so as to transmit signals, and another second connection port MP21 may be provided so as to receive signals.

The second connection port MP21 may be implemented in the form of a socket or a plug. A second communication member 911 such as a cable may be coupled to the second connection port MP21, and the second substrate MP2 and the third substrate 903 of the switching module 900 may transmit and receive electrical signals to and from each other through the second communication member 911.

According to at least one embodiment, the second connection port MP21 may be provided so as to be directly and physically coupled to a fourth connection port 902 provided in the third substrate 903.

According to at least one embodiment, the electrical signal output from the second rectifying unit 262 provided in the second substrate MP2 may be transmitted to the switching module 900 through the second connection port MP21 and the fourth connection port 902. The switching module 900 may distribute the transmitted electrical signals, switch the distributed electrical signals as necessary, and transmit the switched electrical signals to any one of the first substrate MP1 and the second substrate MP2.

The switching module 900 may be provided so as to perform the function of the above-described switching unit 800. According to at least one embodiment, the switching module 900 may include various components to perform the function of the switching unit 800, the third substrate 903, and the third and fourth connection ports 901 and 902 installed in the third substrate 903.

The various components to perform the function of the switching unit 800 may include an electrical circuit, a switch for opening and closing the electrical circuit, or the related various components.

Referring to FIGS. 25A and 25B, the third substrate 903 may be provided so as to be physically separated from the first substrate MP1 and the second substrate MP2. In the third substrate 903, various components to allow the switching module 900 to perform the function of the above-described switching unit 800 may be disposed and installed. These components may be installed on one surface or both surfaces of the third substrate 903. The switching module 900 may perform the function of the above-described switching unit 800 according to operations of the components.

The third substrate 903 may be provided so as to be mounted to or separated from the one surface 13a inside the lower frame 13 as illustrated in FIG. 25B, as necessary. On the one surface 13a inside the lower frame 13, a predetermined fastener may be provided so that the third substrate 903 may be stably mounted to the one surface 13a. The fastener may be implemented in the form of a latch to which the third substrate 903 is hooked, a screw coupling groove to which a screw passing through the third substrate 903 is coupled, a protrusion that can be inserted into an insertion groove provided in the third substrate 903, or the like.

The third connection port 901 and the fourth connection port 902 may be implemented through a connector such as a socket or a plug. The third connection port 901 may electrically connect the switching module 900 and the first substrate MP1 through the first communication member 910 such as a cable, and the fourth connection port 902 may electrically connect the switching module 900 and the second substrate MP2 through the second communication member 911. According to at least one embodiment, the third connection port 901 and the fourth connection port 902 may be provided so as to be directly and physically coupled to the corresponding connection ports MP11 and MP21 provided in the first substrate MP1 and the second substrate MP2, and the third connection port 901 and the fourth connection port 902 may be electrically connected to the corresponding connection ports MP11 and MP21 according to physical coupling. Thus, the switching module 900 may be electrically connected to the first substrate MP1 and the second substrate MP2.

The switching unit 800 may receive electrical signals generated in the first substrate MP1 or the second substrate MP2 through the third connection port 901 and the fourth connection port 902 formed in the third substrate 903, for example, receive a current, or transmit the switched current to the first substrate MP1 or the second substrate MP2. The switching unit 800 may distribute or switch the electrical signal transmitted from any one of the third connection port 901 and the fourth connection port 902, and then transmit the distributed or switched electrical signal to at least one of the first substrate MP1 and the second substrate MP2 through at least one of the third connection port 901 and the fourth connection port 902. The switching unit 800 may transmit the current output from the first rectifying unit 261 and transmitted through the third connection port 901, to the second coil driving circuit 312 of the first substrate MP1, or transmit the current output from the second rectifying unit 262 and transmitted through the fourth connection port 902, to the second coil driving circuit 312 of the first substrate MP1.

Figure 26:
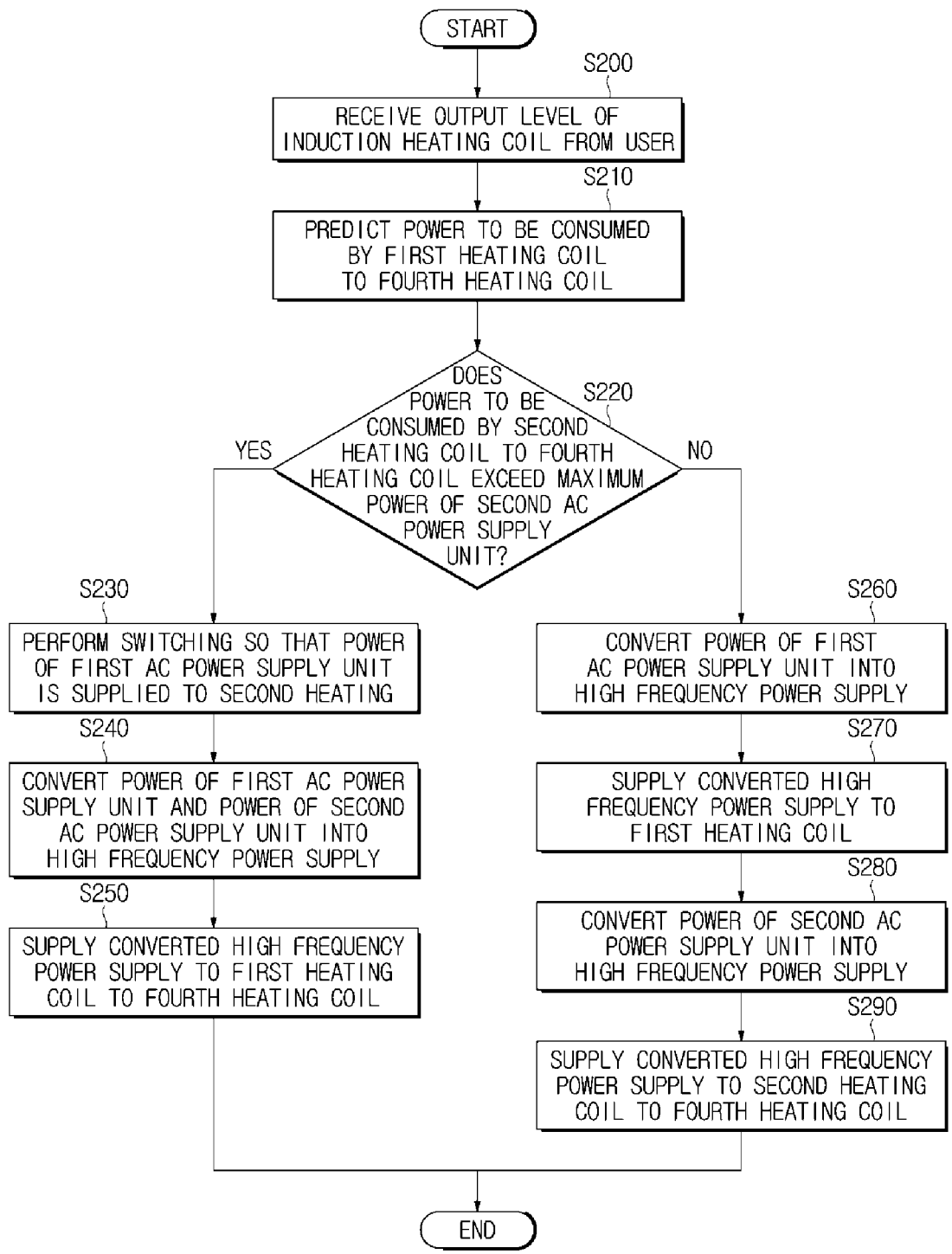
FIG. 26 is a flowchart illustrating a method of providing power of another power supply unit to heating coils in accordance with at least one exemplary embodiment.

FIG. 26 is a flowchart illustrating a method of providing power of another power supply unit to heating coils in accordance with one embodiment of the at least one exemplary embodiment.

As illustrated in FIG. 26, a user interface may receive a command concerning an output level of induction heating coils from a user in operation S200, output an electrical signal corresponding to the received command, and transmit the output electrical signal to a control unit. In operation S210, the control unit may predict power to be consumed by a first heating coil to a fourth heating coil based on the transmitted user's command.

In operation S220, the control unit may determine whether the power to be consumed by the second heating coil to the fourth heating coil exceeds a maximum power of a second AC power supply unit based on the predicted power consumption of the heating coils.

In operation S230, when the power to be consumed by the second heating coil to the fourth heating coil exceeds the maximum power of the second AC power supply unit, the switching unit may switch power of a first AC power supply unit so as to be supplied to the second heating coil to the fourth heating coil. A coil driving unit may convert the power of the first AC power supply unit and the power of the second AC power supply unit into a high frequency power supply in operation S240, and supply the converted high frequency power supply to the first heating coil to the fourth heating coil in operation S250.

When the power to be consumed by the second heating coil to the fourth heating coil does not exceed the maximum power of the second AC power supply unit, the switching unit may switch the power of the first AC power supply unit to be supplied to the first heating coil and the power of the second AC power supply unit to be supplied to the second heating coil to the fourth heating coil. The coil driving unit may convert the power of the first AC power supply unit into a high frequency power supply in operation S260, and supply the converted high frequency power supply to the first heating coil in operation S270. The coil driving unit may convert the power of the second AC power supply unit into a high frequency power supply in operation S280, and supply the converted high frequency power supply to the second heating coil to the fourth heating coil in operation S290.

As described above, according to the above-described cooking apparatus and the method of controlling the cooking apparatus, it is possible to stably provide power to the heating coil of the high power burner.

Although a few embodiments of the at least one exemplary embodiment have been illustrated and described, it would be appreciated by those skilled in the art that changes may be made in these embodiments without departing from the principles and spirit of the invention, the scope of which is defined in the claims and their equivalents.

What is claimed is:

1. A method for controlling a cooking apparatus, comprising:
    supplying first AC power of a first phase of a first alternating current (AC) power supply unit to a first heating coil included in a high power burner;
    supplying second AC power of a second phase of a second AC power supply unit to at least one of a second heating coil included in the high power burner, a third heating coil in a low power burner and a fourth heating coil in another low power burner, the first and second phases being different; and selectively distributing the supplied second AC power to one or more of the second heating coil, the third heating coil, and the fourth heating coil based on a priority of the second heating coil, the third heating and the fourth heating coil.

2. The method according to claim 1, wherein the selectively distributing the supplied second AC power includes distributing the second AC power so that power obtained by subtracting power provided to the third heating coil from maximum power of the second AC power supply unit is provided to the second heating coil and the fourth heating coil.

3. The method according to claim 1, wherein the selectively distributing the supplied second AC power includes distributing the second AC power so that power obtained by subtracting power provided to the second heating coil from maximum power of the second AC power supply unit is provided to the third heating coil and the fourth heating coil.

4. The method according to claim 1, wherein the selectively distributing the supplied second AC power includes distributing the power supplied by the second AC power supply unit so that power obtained by subtracting power provided to the fourth heating coil from maximum power of the second AC power supply unit is provided to the second heating coil and the third heating coil.

5. The method according to claim 1, further comprising:
detecting power provided to the first heating coil to the fourth heating coil by detecting a current introduced into the first heating coil to the fourth heating coil.

6. The method according to claim 1, further comprising:
detecting power to be consumed by detecting a current flowing out from the first AC power supply unit and the second AC power supply unit.

7. The method according to claim 1, further comprising:
receiving an output level of induction heating coils from a user.

8. The method according to claim 7, further comprising:
switching a switching unit so that the first AC power supplied by the first AC power supply unit is provided to at least one of the second heating coil, the third heating coil, and the fourth heating coil when an operation according to the received output level exceeds a maximum power of the second AC power supply unit.

9. The method according to claim 7, further comprising:
adjusting a coil driving unit so that the first AC power of the first AC power supply unit is provided to the second heating coil to the fourth heating coil when an operation according to the received output level exceeds a maximum power of the second AC power supply unit.

10. A method for controlling a cooking apparatus, comprising:
supplying power of a first alternating current (AC) power supply unit to a first heating coil included in a high power burner;
supplying power of a second AC power supply unit to at least one of a second heating coil included in the high power burner and a third heating coil and a fourth heating coil each included in a low power burner;
distributing the supplied power of the second AC power supply unit to at least one heating coil having a higher priority among a priority of the second heating coil, the third heating coil, and the fourth heating coil;
receiving an output level of induction heating coils from a user; and
switching a switching unit so that the power supplied by the first AC power supply unit is provided to at least one of the second heating coil, the third heating coil, and the fourth heating coil when an operation according to the received output level exceeds maximum power of the second AC power supply unit.

11. A method for controlling a cooking apparatus, comprising:
supplying power of a first alternating current (AC) power supply unit to a first heating coil included in a high power burner;
supplying power of a second AC power supply unit to at least one of a second heating coil included in the high power burner and a third heating coil and a fourth heating coil each included in a low power burner;
distributing the supplied power of the second AC power supply unit to at least one heating coil having a higher priority among a priority of the second heating coil, the third heating coil, and the fourth heating coil;
receiving an output level of induction heating coils from a user; and
adjusting a coil driving unit so that the power of the first AC power supply unit is provided to the second heating coil to the fourth heating coil when an operation according to the received output level exceeds maximum power of the second AC power supply unit.

* * * * *